United States Patent [19]

Kido et al.

[11] Patent Number: 4,719,518
[45] Date of Patent: Jan. 12, 1988

[54] MAGNETIC RECORDING APPARATUS FOR CARRYING OUT RECORDING BY SELECTIVELY USING ONE OF TWO KINDS OF RECORDING SYSTEMS

[75] Inventors: Koichi Kido, Yokosuka; Kenji Shibayama, Tokyo; Masahiko Tsuruta, Yokohama; Akira Hirota, Chigasaki; Masato Mihara, Hiratsuka; Osamu Inoue, Yokohama, all of Japan

[73] Assignee: Victor Company of Japan, Ltd., Yokohama, Japan

[21] Appl. No.: 899,545

[22] Filed: Aug. 22, 1986

[30] Foreign Application Priority Data

Aug. 23, 1985 [JP] Japan ................ 60-185588
Aug. 26, 1985 [JP] Japan ................ 60-187030
Aug. 30, 1985 [JP] Japan ................ 60-191155
Aug. 30, 1985 [JP] Japan ................ 60-191156
Sep. 18, 1985 [JP] Japan ................ 60-205804

[51] Int. Cl.⁴ .................................... H04N 980
[52] U.S. Cl. ........................... 358/330; 358/328; 360/19.1
[58] Field of Search ............ 360/33.1; 358/310, 327, 358/328, 330

[56] References Cited

U.S. PATENT DOCUMENTS

| | | | |
|---|---|---|---|
| 4,296,430 | 10/1981 | Warren | 358/328 |
| 4,593,327 | 6/1986 | Hirota et al. | 358/330 |
| 4,608,611 | 8/1986 | Ota | 358/328 |
| 4,630,132 | 12/1986 | Terada et al. | 358/310 |
| 4,647,983 | 3/1987 | Ota | 358/330 |
| 4,656,527 | 4/1987 | Uchimi | 358/310 |

OTHER PUBLICATIONS

"In-Camera VTR System" by Takano et al., Technical Report of the Institute of Television Engineers of Japan, Jul. 29, 1982.
"Betacam System" by Takano et al., Technical Report of the Institute of Television Engineers of Japan, Jul. 29, 1982.

Primary Examiner—Donald McElheny, Jr.
Attorney, Agent, or Firm—Michael N. Meller

[57] ABSTRACT

A magnetic recording apparatus for carrying out a recording by selectively using one of two kinds of recording systems comprises first through fourth rotary magnetic heads, a first circuit for producing an FM luminance signal, second and third circuits for producing first and second frequency division multiplexed signals, and a switching circuit. The first and second heads are mounted on a rotary body at mutually opposing positions, and have the same height position. The third and fourth heads are mounted on the rotary body at mutually opposing positions respectively in vicinities of the first and second heads along a rotating direction of the rotary body, and have the same height position. The switching circuit selectively supplies the output signals of the first and second circuits to the first through fourth heads when a luminance/color separation recording system is selected as the recording system, and selectively supplies the output signal of the third circuit to the first and second heads or to the third and fourth heads when a low band conversion color recording system is selected as the recording system.

12 Claims, 29 Drawing Figures

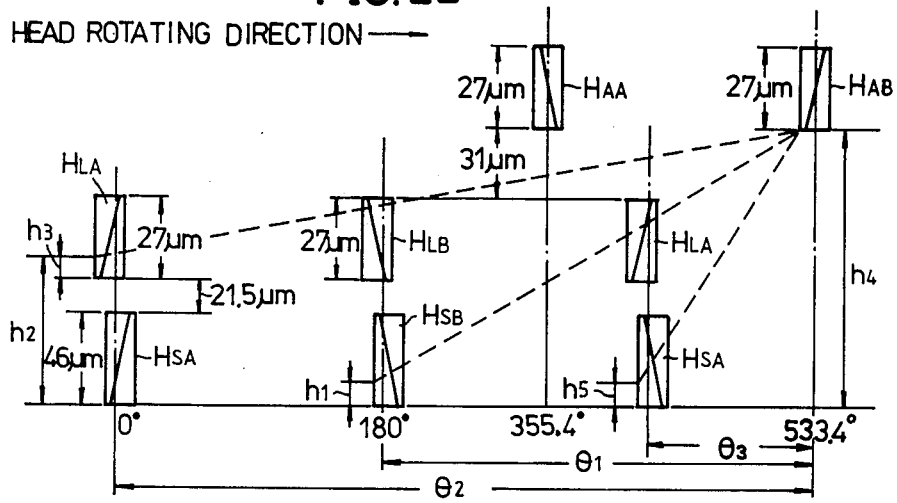

MAGNETIC RECORDING APPARATUS FOR CARRYING OUT RECORDING BY SELECTIVELY USING ONE OF TWO KINDS OF RECORDING SYSTEMS

BACKGROUND OF THE INVENTION

The present invention generally relates to magnetic recording apparatuses for carrying out a recording by selectively using one of two kinds of recording systems, and more particularly to a magnetic recording apparatus for carrying out a recording by arbitrarily selecting and using one of a luminance/color separation recording system and a low band conversion color recording system which is the system employed in an existing magnetic recording and/or reproducing apparatus, where the luminance/color separation recording system independently but simultaneously records a luminance signal and a color signal on two tracks of a magnetic tape by use of rotary magnetic heads and the low band conversion color recording system records on a magnetic tape by use of rotary magnetic heads a frequency division multiplexed signal comprising a frequency modulated luminance signal and a frequency converted carrier chrominance signal which has been frequency-converted into a frequency band lower than a frequency band of the frequency modulated luminance signal.

Presently, a helical scan type magnetic recording and/or reproducing apparatus (hereinafter simply referred to as a video tape recorder or VTR) for home use which plays a magnetic tape having a width of ½ inch employs the so-called low band conversion color recording and reproducing system because the recording and reproducing frequency band of the VTR for home use is relatively narrow. According to the low band conversion color recording and reproducing system, a luminance signal separated from a color video signal is frequency-modulated, and carrier chrominance signal separated from the color video signal is frequency-converted into a frequency band lower than a frequency band of the frequency modulated (FM) luminance signal. The FM luminance signal and the frequency converted carrier chrominance signal are frequency-division-multiplexed into a frequency division multiplexed signal, and this frequency division multiplexed signal is recorded on and reproduced from the magnetic tape. Furthermore, in order to improve the tape utilization efficiency, no guard band is formed between two mutually adjacent tracks on the magnetic tape by setting rotary magnetic heads which record the two mutually adjacent tracks to have gaps with different azimuth angles.

However, according to the low band conversion color recording and reproducing system, there are the following problems. Firstly, the recording and reproducing frequency band of the luminance signal and the carrier chrominance signal is limited, and the recording and reproducing frequency band is not quite sufficient for obtaining a high picture quality. Secondly, the frequency converted carrier chrominance signal is a balanced modulated wave when recording an NTSC system or PAL system color video signal, and the signal-to-noise (S/N) ratio becomes poor due to AM noise of the reproduced frequency converted carrier chrominance signal caused by inconsistent contact between the magnetic tape and the rotary magnetic heads. Thirdly, noise is generated in the horizontal direction of the picture due to residual time base fluctuation component (jitter) included in the reproduced carrier chrominance signal. Fourthly, since the azimuth loss effect is insufficient in the low frequencies when the recording is carried out without forming a guard band between the two mutually adjacent tracks, the frequency converted carrier chrominance signal recorded on the adjacent track mixes into the reproduced signal as crosstalk. Hence, measures must be taken to eliminate such crosstalk. As examples of such measures against crosstalk, the phase of the chrominance subcarrier of the frequency converted carrier chrominance signal of the NTSC system or PAL system is shifted by approximately 90° for every one horizontal scanning period at the time of the recording and at the time of the reproduction (for example, as disclosed in a U.S. Pat. No. 4,178,606 in which the assignee is the same as the assignee of the present application), or the phase of only the frequency converted carrier chrominance signal which is recorded on one of the two mutually adjacent tracks is inverted for every one horizontal scanning period.

In order to obtain a reproduced color video signal having a high picture quality compared to that of the VTR employing the low band conversion color recording and reproducing system, it is possible to employ the so-called luminance/color (Y/C) separation recording and reproducing system. For example, a one-body type VTR for broadcasting use having a built-in camera employs the Y/C separation recording and reproducing system. According to the Y/C separation recording and reproducing system, the luminance signal and the color signal are independently but simultaneously recorded on and reproduced from two tracks of the magnetic tape, and a guard band is formed between the two mutually adjacent tracks. However, the Y/C separation recording and reproducing system is not compatible with the low band conversion color recording and reproducing system, and for this reason, it is impossible to carry out the recording and/or reproduction on one existing VTR by arbitrarily selecting the recording and reproducing system from the two systems.

On the other hand, according to the Y/C separation recording and reproducing system, an audio signal is recorded together with a bias signal by a stationary magnetic head, that is, the audio signal is recorded according to the so-called linear recording system. As a result, there is a problem in that the quality of the reproduced audio signal is not high. Furthermore, when designing a VTR so as to carry out the recording by arbitrarily selecting the system from the two systems, it is desirable from the point of view of obtaining a reproduced audio signal of a high quality that the audio signal is recordable by use of the rotary magnetic heads.

SUMMARY OF THE INVENTION

Accordingly, it is a general object of the present invention to provide a novel and useful magnetic recording apparatus for carrying out a recording by selectively using one of two kinds of recording systems which satisfies the above described demands and in which the problems described before are eliminated.

Another and more specific object of the present invention is to provide a magnetic recording apparatus in which a magnetic tape is transported at a tape transport speed faster than a predetermined tape transport speed and a wide track recorded with a frequency modulated (FM) luminance signal by one of first and second rotary magnetic heads having gaps with mutually different azimuth angles and a narrow track recorded with a frequency modulated color signal by one of third and fourth rotary magnetic heads having gaps with mutually different azimuth angles are formed independently but simultaneously on the magnetic tape in a first connection state of switching means, and the first and second rotary magnetic heads or the third and fourth rotary magnetic heads are used to record on the magnetic tape a frequency division multiplexed signal comprising an FM luminance signal and a frequency converted carrier chrominance signal which has been frequency-converted into an unoccupied frequency band lower than a frequency band of the FM luminance signal in a second connection state of the switching means. According to the magnetic recording apparatus of the present invention, there is mechanical interchangeability with an existing VTR which employs the low band conversion color recording system that records the frequency division multiplexed signal comprising the FM luminance signal and the frequency converted carrier chrominance signal. In addition, it is possible to carry out the recording according to the luminance/color (Y/C) separation recording system by use of the first through fourth rotary magnetic heads without increasing the number of rotary magnetic heads nor the number of rotary transformers. In the case where the recording is carried out according to the Y/C separation recording system, moire and cross color generated when the frequency division multiplexed signal comprising the FM luminance signal and the frequency converted carrier chrominance signal is recorded and reproduced from the magnetic tape will not occur, and it is possible to provide a sufficiently wide recording and reproducing frequency band for both the luminance signal and the color difference signals. Furthermore, because the Y/C separation recording system does not carry out the bias recording of the frequency converted carrier chrominance signal by the FM luminance signal, the noise in the horizontal direction of the picture will not be generated and the S/N ratio of the reproduced color difference signals can be improved. Thus, it is possible to obtain a reproduced color video signal of a high picture quality according to the Y/C separation recording system. In addition, it is possible to record on a single magnetic recording apparatus a magnetic tape which is playable on the existing VTR employing the low band conversion color recording system and a magnetic tape which is playable on an existing VTR which employs the Y/C separation recording system.

Still another object of the present invention is to provide a magnetic recording apparatus in which a track recorded with an FM luminance signal by one of the first and second rotary magnetic heads and a track recorded with a frequency modulated (FM) line-sequential color difference signal by one of the third and fourth rotary magnetic heads are formed independently but simultaneously on the magnetic tape and a frequency modulated (FM) PCM audio signal is recorded together with the FM line-sequential color difference signal by one of the third and fourth rotary magnetic heads in the first connection state of the switching means, and the first and second rotary magnetic heads or the third and fourth rotary magnetic heads are used to record on the magnetic tape a frequency division multiplexed signal comprising an FM luminance signal and a frequency converted carrier chrominance signal which has been frequency-converted into an unoccupied frequency band lower than a frequency band of the FM luminance signal in the second connection state of the switching means. The FM line-sequential color difference signal is obtained by frequency-modulating a low-frequency carrier by a line-sequential color difference signal, and the FM PCM audio signal is obtained by frequency-modulating a high-frequency carrier by a pulse code modulated (PCM) audio signal. According to the magnetic recording apparatus of the present invention, it is possible to carry out the recording so that a reproduced color video signal of a high picture quality and a reproduced audio signal of a high quality are obtainable at the time of the reproduction. Moreover, the deterioration in the signal quality is extremely small when a dub-recording is carried out. In the first connection state of the switching means, it is possible to carry out the so-called after-recording on a magnetic tape which is pre-recorded with the video signal and record the FM PCM audio signal by the third and fourth rotary magnetic heads.

A further object of the present invention is to provide a magnetic recording apparatus in which a rotary body is provided with fifth and sixth rotary magnetic heads exclusively for recording the audio signal in addition to the first through fourth rotary magnetic heads. A track recorded with an FM luminance signal by one of the first and second rotary magnetic heads and a track recorded with a frequency modulated color signal by one of the third and fourth rotary magnetic heads are formed independently but simultaneously on the magnetic tape in the first connection state of the switching means, and the first and second rotary magnetic heads or the third and fourth rotary magnetic heads are used to record in a surface portion of a magnetic layer of the magnetic tape a frequency division multiplexed signal comprising an FM luminance signal and a frequency converted carrier chrominance signal which has been frequency-converted into an unoccupied frequency band lower than a frequency band of the FM luminance signal and the fifth and sixth rotary magnetic heads are used to record in a deep portion of the magnetic layer of the magnetic tape an FM audio signal in the second connection state of the switching means. According to the magnetic recording apparatus of the present invention, it is possible to carry out the recording based on an arbitrarily selected one of the Y/C separation recording system and the low band conversion color recording system. In the case of the recording based on the low band conversion color recording system, the FM audio signal is recorded without the need to provide an audio track exclusively for recording the audio signal at a position other than the video track. Since the FM audio signal is recorded on an audio track in the deep portion of the magnetic layer of the magnetic tape and the frequency division multiplexed signal is recorded over the audio track on a video track in the surface portion of the magnetic layer of the magnetic tape, it is possible to improve the utilization efficiency of the magnetic tape.

Another object of the present invention is to provide a magnetic recording apparatus in which the mounting positions of the fifth and sixth rotary magnetic heads are selected so that the audio track is formed in the deep portion of the magnetic layer of the magnetic tape prior to the formation of the video track by one of the first and second rotary magnetic heads or one of the third and fourth rotary magnetic heads even in the case of the recording based on the Y/C separation recording system. According to the magnetic recording apparatus of the present invention, it is possible to record the audio signal by the rotary magnetic heads not only during the recording based on the low band conversion color recording system but also during the recording based on the Y/C separation recording system. In addition, compared to the case where the audio signal is recorded together with the video signal on the video track, it is possible to reserve a wide frequency band for the video signal which is recorded on the video track and a reproduced video signal of a high picture quality can be obtained.

Still another object of the present invention is to provide a magnetic recording apparatus in which, out of the two parallel tracks formed simultaneously during the recording based on the Y/C separation recording system, the track recorded with the frequency modulated color signal is recorded with a pulse code modulated (PCM) audio signal which is added with a second synchronizing signal. The second synchronizing signal is synchronized to a first synchronizing signal of the video signal, with a predetermined time difference related to a difference between the mounting positions of the rotary magnetic heads on the rotary body. According to the magnetic recording apparatus of the present invention, it is possible to record data of the PCM audio signal by avoiding the head switching points, so that the PCM audio signal can be reproduced without loss of information. As a result, it is possible to obtain together with a video signal of a high picture quality a reproduced audio signal which has no data error and has a high quality.

Other objects and further features of the present invention will be apparent from the following detailed description when read in conjunction with the accompanying drawings.

BRIEF DESCRIPTION OF THE DRAWINGS

FIG. 22 shows the arrangement of the rotary magnetic heads on the rotary body in a seventh embodiment of the magnetic recording apparatus according to the present invention;

FIG. 23 shows the track pattern formed in the seventh embodiment of the magnetic recording apparatus according to the present invention when the Y/C separation recording system is selected;

DETAILED DESCRIPTION

Figure 1:
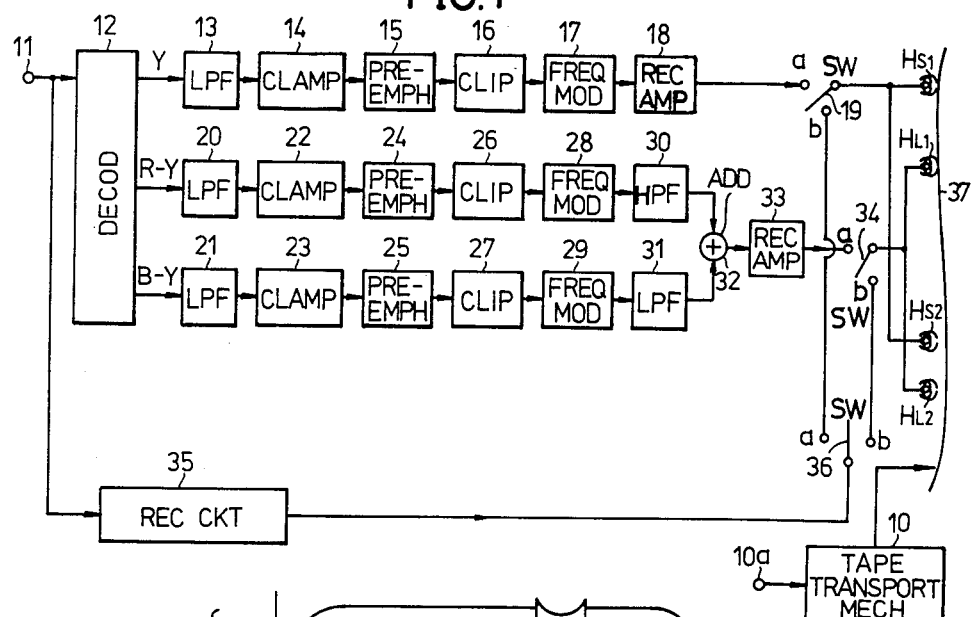
FIG. 1 is a system block diagram showing a first embodiment of the magnetic recording apparatus according to the present invention.
Figure 2:
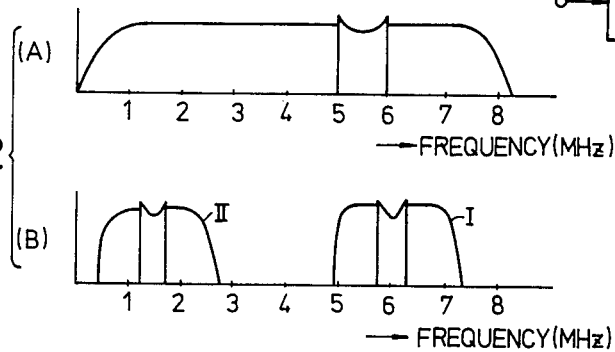
FIGS. 2(A) and 2(B) show frequency spectrums of signals at essential parts of the block system shown in FIG. 1.

In FIG. 1, an input composite color video signal applied to an input terminal 11 is supplied to a decoder 12. The decoder 12 performs frequency selection, demodulation and the like to obtain a luminance signal Y and two kinds of color difference signals $R-Y$ and $B-Y$ from the input composite color video signal. The frequency band of the luminance signal Y is wider than the frequency band of the luminance signal recorded according to the low band conversion color recording system. The luminance signal Y is supplied to a frequency modulator 17 via a lowpass filter 13, a clamping circuit 14, a pre-emphasis circuit 15 and a white/dark clipping circuit 16. The frequency modulator 17 produces an FM luminance signal having a carrier deviation band of 5 MHz to 6 MHz as shown in FIG. 2(A). The FM luminance signal is passed through a recording amplifier 18 and is supplied to a contact a of a switch 19. Unlike in the case of the conventional low band conversion color recording and reproducing system, there is no need to provide a highpass filter on the output side of the frequency modulator 17. This is because only the FM luminance signal is recorded on one track.

On the other hand, the color difference signal R−Y is supplied to a frequency modulator 28 via a lowpass filter 20, a clamping circuit 22, a pre-emphasis circuit 24 and a white/dark clipping circuit 26. Similarly, the color difference signal B−Y is supplied to a frequency modulator 29 via a lowpass filter 21, a clamping circuit 23, a pre-emphasis circuit 25 and a white/dark clipping circuit 27. Hence, a first FM color difference signal having a frequency spectrum I shown in FIG. 2(B) is obtained from the frequency modulator 28, and a second FM color difference signal having a frequency spectrum II shown in FIG. 2(B) is obtained from the frequency modulator 29. The first FM color difference signal is supplied to an adder 32 via a highpass filter 30, and the second FM color difference signal is supplied to the adder 32 via a lowpass filter 31. Output signals of the highpass filter 30 and the lowpass filter 31 are frequency-division-multiplexed in the adder 32, and an output first frequency division multiplexed signal of the adder 32 is passed through a recording amplifier 33 and is supplied to a contact a of a switch 34.

The input composite color video signal is also supplied to a recording circuit 35 which is known. The input composite color video signal is subjected to a known signal processing in accordance with the low band conversion color recording and reproducing system in the recording circuit 35 and is converted into a second frequency division multiplexed signal comprising an FM luminance signal and a frequency converted carrier chrominance signal which has been frequency-converted into a frequency band lower than a frequency band of the FM luminance signal. The output second frequency division multiplexed signal of the recording circuit 35 is supplied to a common contact of a switch 36.

The switches 19 and 34 are linked to each other. In a first connection state, the switches 19 and 34 are connected to the respective contacts a. In a second connection state, the switches 19 and 34 are connected to respective contacts b and the switch 36 is connected to a contact a. In a third connection state, all of the switches 19, 34 and 36 are connected to the respective contacts b.

First, description will be given with respect to the first connection state. In the first connection state, the FM luminance signal from the recording amplifier 18 is passed through the switch 19 and is supplied to standard mode rotary magnetic heads $H_{S1}$ and $H_{S2}$. At the same time, the first frequency division multiplexed signal from the recording amplifier 33 is passed through the switch 34 and is supplied to extended (long-time) mode rotary magnetic heads $H_{L1}$ and $H_{L2}$. The switch 36 may be connected to either one of the contacts a and b.

Figure 3:
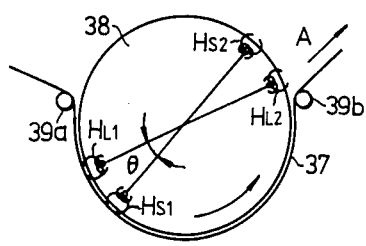
FIG. 3 shows the arrangement of rotary magnetic heads on a rotary body in the first embodiment of the magnetic recording apparatus according to the present invention.

The heads $H_{S1}$, $H_{S2}$, $H_{L1}$ and $H_{L2}$ are mounted on a rotary body 38 shown in FIG. 3. A magnetic tape 37 which is transported in a direction A is wrapped obliquely around an outer peripheral surface of the rotary body 38 for a predetermined angular range which is over 180° and is defined by guide poles 39a and 39b for guiding the tape 37. The heads $H_{S1}$ and $H_{S2}$ are mounted at mutually opposing positions on a rotational plane of the rotary body 38, and the heads $H_{L1}$ and $H_{L2}$ are mounted at mutually opposing positions on the rotational plane of the rotary body 38 lagging the respective heads $H_{S1}$ and $H_{S2}$ by an angle $\theta$ along a rotating direction of the rotary body 38. For example, the angle $\theta$ is selected to a recording wavelength of 7 H on the tape 37, where H denotes one horizontal scanning period. The rotary body 38 rotates counterclockwise at a speed of 30 revolutions per second, for example. For example, the heads $H_{S1}$ and $H_{S2}$ have a track width of 47 microns and the heads $H_{L1}$ and $H_{L2}$ have a track width of 27 microns. In addition, the heads $H_{S1}$, $H_{S2}$, $H_{L1}$ and $H_{L2}$ have gaps with azimuth angles identical to those of rotary magnetic heads used in the existing VTR employing the low band conversion color recording and reproducing system. Accordingly, the heads $H_{S1}$ and $H_{L1}$ have gaps with an azimuth angle of +6°, and the heads $H_{S2}$ and $H_{L2}$ have gaps with an azimuth angle of −6°, for example.

The heads $H_{S1}$ and $H_{S2}$ are mounted at the same height position along an axial direction of the rotary body 38. The heads $H_{L1}$ and $H_{L2}$ are mounted at the same height position which is 21 microns higher than that of the heads $H_{S1}$ and $H_{S2}$, for example.

Figure 4A:
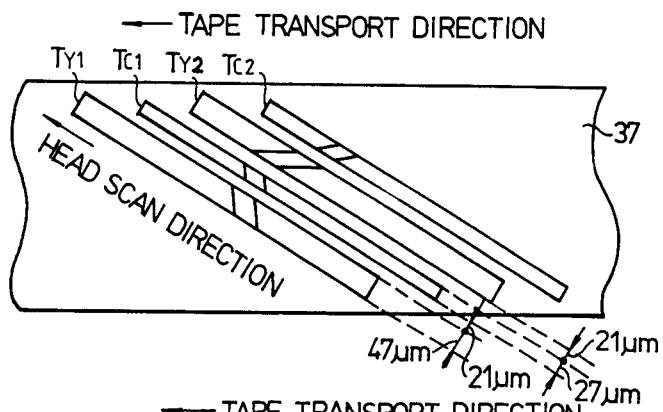
FIGS. 4A, 4B and 4C show embodiments of the track pattern formed on the magnetic tape in the magnetic recording apparatus shown in FIG. 1.

In the first connection state, a mode control signal is applied to a terminal 10a to control a tape transport mechanism 10 so that the tape 37 is transported at a tape transport speed which is twice that of a standard mode, for example. Hence, tracks are formed obliquely to the longitudinal direction of the tape 37 with a track pitch of 116 microns, for example. The tape transport mechanism 10 has a known construction and comprises a capstan, a pinch roller and the like. As a result, a track pattern shown in FIG. 4A is formed on the tape 37. During a certain one field period, the FM luminance signal having the frequency spectrum shown in FIG. 2(A) is recorded on a track $T_{Y1}$ having a track width of 47 microns by the head $H_{S1}$, and at the same time, the first frequency division multiplexed signal having the frequency allocation shown in FIG. 2(B) is recorded on a track $T_{C1}$ having a track width of 27 microns by the head $H_{L1}$. During a one field period next to the certain one field period, the FM luminance signal is recorded on a track $T_{Y2}$ having a track width of 47 microns by the head $H_{S2}$, and at the same time, the first frequency division multiplexed signal is recorded on a track $T_{C2}$ having a track width of 27 microns by the head $H_{L2}$. Similarly thereafter, two parallel tracks are simultaneously formed on the tape 37 for every one field, with the track pitch of 116 microns. Since a guard band having a width of 21 microns is formed between two mutually adjacent tracks, it is possible to reduce the undesirable effects of the crosstalk from the adjacent track.

Because the FM luminance signal having the wide frequency band as shown in FIG. 2(A) is recorded on the wider tracks $T_{Y1}$ and $T_{Y2}$ having the track width of 47 microns, it is possible to obtain a reproduced luminance signal having a satisfactory S/N ratio. On the other hand, although the first and second FM color difference signals are recorded on the narrower tracks $T_{C1}$ and $T_{C2}$ having the track width of 27 microns, it is possible to obtain satisfactory reproduced color difference signals since the frequency bands of the first and second FM color difference signals are narrow compared to the frequency band of the FM luminance signal.

Next, in the second connection state, the tape 37 is transported by the tape transport mechanism 10 at a predetermined tape transport speed identical to a tape transport speed in a standard mode of the existing VTR employing the low band conversion color recording and reproducing system, so that the tracks are formed with a track pitch of 58 microns, for example. In this case, the second frequency division multiplexed signal from the recording circuit 35 is supplied to the heads $H_{S1}$ and $H_{S2}$ via the switches 36 and 19, but the supply of the first frequency division multiplexed signal from the recording amplifier 33 to the heads $H_{L1}$ and $H_{L2}$ is cut off by the switch 34. Hence, the heads $H_{L1}$ and $H_{L2}$ stop the recording operation.

Figure 4B:
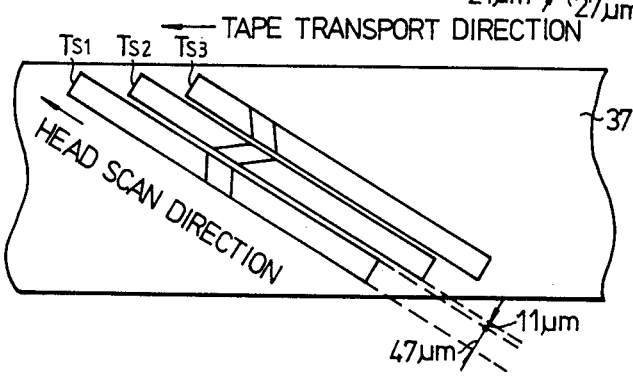

As a result, a track pattern shown in FIG. 4B is formed on the tape 37. The heads $H_{S1}$ and $H_{S2}$ alternately record the second frequency division multiplexed signal on the tape 37 for every one field, and tracks $T_{S1}$, $T_{S2}$ and $T_{S3}$ recorded with the second frequency division multiplexed signal are successively formed on the tape 37. In FIG. 4B, the tracks are formed with the track pitch of 58 microns, and the track width of the tracks $T_{S1}$ and the like is 47 microns. A guard band having a width of 11 microns is formed between two mutually adjacent tracks.

Next, in the third connection state, the recording is carried out in the extended (long-time) mode. In other words, the tape 37 is transported by the tape transport mechanism 10 at a predetermined low tape transport speed identical to a tape transport speed in an extended (long-time) mode of the existing VT employing the low band conversion color recording and reproducing system, so that the tracks are formed with a track pitch of 19 microns, for example. In this case, the supply of the signal to the heads $H_{S1}$ and $H_{S2}$ is cut off by the switches 19 and 36, and the heads $H_{S1}$ and $H_{S2}$ stop the recording operation. On the other hand, the second frequency division multiplexed signal from the recording circuit 35 is supplied to the heads $H_{L1}$ and $H_{L2}$ via the switches 36 and 34.

Figure 4C:
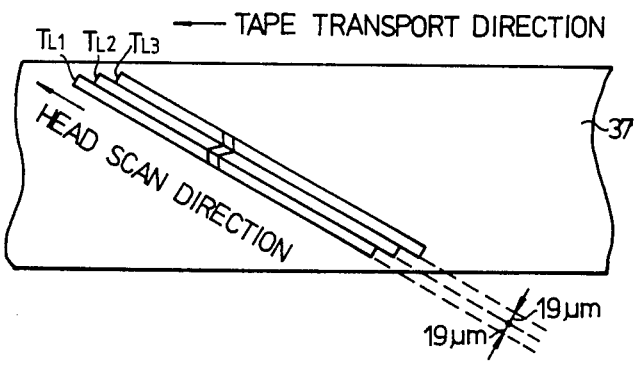

Accordingly, a track pattern shown in FIG. 4C is formed on the tape 37. The heads $H_{L1}$ and $H_{L2}$ alternately record the second frequency division multiplexed signal on the tape 37 for every one field, and tracks $T_{L1}$, $T_{L2}$ and $T_{L3}$ recorded with the second frequency division multiplexed signal are successively formed on the tape 37. In FIG. 4C, the tracks are formed with the track pitch of 19 microns. The heads $H_{L1}$ and $H_{L2}$ have gaps with azimuth angles identical to those of the rotary magnetic heads used in the existing VTR employing the low band conversion color recording and reproducing system and have a track width of 27 microns. However, when one of the heads $H_{L1}$ and $H_{L2}$ forms a first track having a width of 27 microns, a portion of the first track, which portion has a width of 8 microns, is erased by a partial overlap formation of a second track having a width of 27 microns by the other of the heads $H_{L1}$ and $H_{L2}$. Hence, as the tracks are successively formed in this manner with the partial overlap, the tracks having a track width of 19 microns remain on the tape 37. The tracks remaining on the tape 37 are formed with a track pitch of 19 microns and without a guard band between the two mutually adjacent tracks.

In FIGS. 4A through 4C, the illustration of tracks formed by stationary magnetic heads, such as a control track and an audio track, is omitted for convenience' sake.

Figure 5:
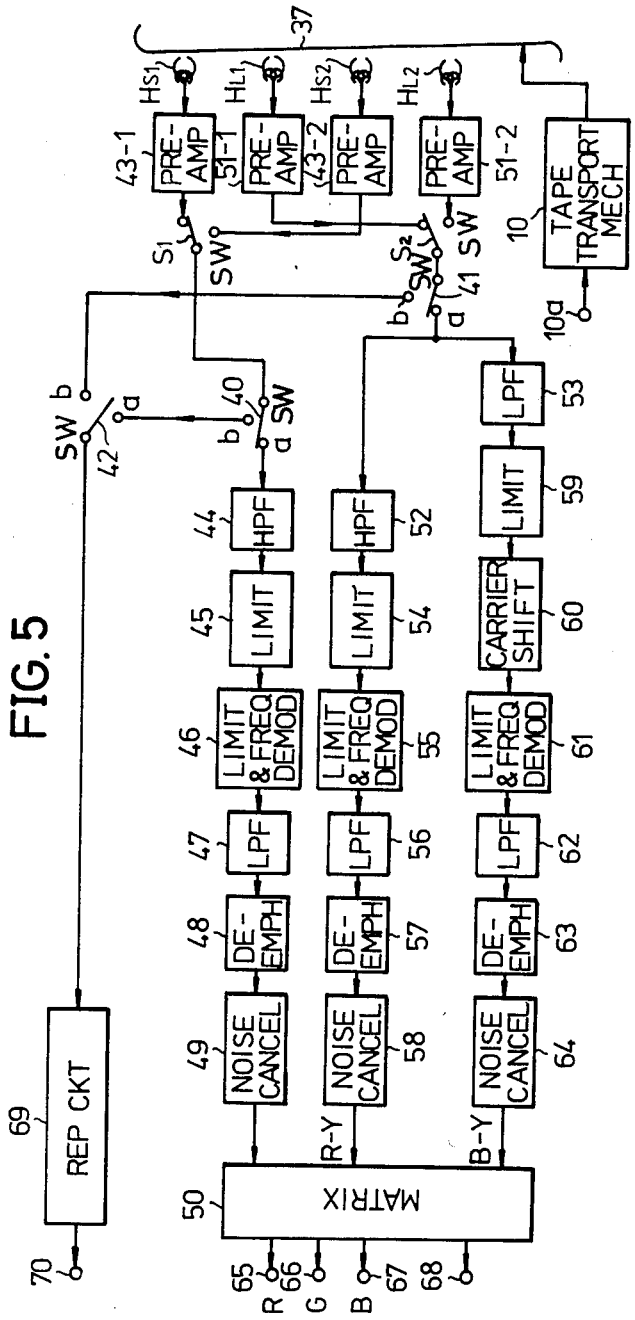
FIG. 5 is a system block diagram showing an example of a reproducing system for reproducing signals from the magnetic tape recorded in the magnetic recording apparatus according to the present invention.

Next, description will be given with respect to a reproducing system for reproducing the signals recorded on the magnetic tape by the magnetic recording apparatus shown in FIG. 1, by referring to FIG. 5. In FIG. 5, those parts which are the same as those corresponding parts in FIG. 1 are designated by the same reference numerals, and description thereof will be omitted. In FIG. 5, switches 40, 41 and 42 are in the first connection state where the switches 40, 41 and 42 are connected to respective contacts a (the switch 42 may be connected to either the contact a or b) when playing the tape 37 which has the Y/C separation track pattern shown in FIG. 4A. The switches 40 through 42 are in the second connection state where the switches 40 and 41 are connected to respective contacts b and the switch 42 is connected to the contact a when playing the tape 37 which has the standard mode track pattern shown in FIG. 4B. Furthermore, the switches 40 through 42 are in the third connection state where all of the switches 40 through 42 are connected to the respective contacts b when playing the tape 37 which as the extended mode track pattern shown in FIG. 4C.

When it is assumed that the tape 37 has the Y/C separation track pattern shown in FIG. 4A, the switches 40 and 41 are connected to the respective contacts a. The heads $H_{S1}$ and $H_{L1}$ simultaneously but independently scan the respective tracks $T_{Y1}$ and $T_{C1}$ during a certain one field period, and the heads $H_{S2}$ and $H_{L2}$ simultaneously but independently scan the respective tracks $T_{Y2}$ and $T_{C2}$ during a one field period next to the certain one field period. In other words, two parallel tracks are simultaneously but independently scanned by the respective heads $H_{S1}$ and $H_{L1}$ or the heads $H_{S2}$ and $H_{L2}$ for every one field, so that the pair of the heads $H_{S1}$ and $H_{L1}$ and the pair of the heads $H_{S2}$ and $H_{L2}$ are alternately used for every one field. The tape transport speed of the tape 37 is of course set identical to that at the time of the recording.

Accordingly, reproduced FM luminance signals from the heads $H_{S1}$ and $H_{S2}$ are alternately obtained for every one field and are supplied to respective pre-amplifiers 43-1 and 43-2 via respective rotary transformers (not shown). Amplified reproduced FM luminance signals from the pre-amplifiers 43-1 and 43-2 are supplied to a switch S1 which is switched over for every one field, and a reproduced FM luminance signal from the switch S1 is supplied to a highpass filter 44 via the switch 40. An output signal of the highpass filter is passed through a first limiter 45 and is supplied to a second limiter and frequency demodulator 46. The highpass filter 44 may be omitted.

A reproduced luminance signal which has the wide frequency band and is obtained from the second limiter and frequency demodulator 46 is supplied to a matrix circuit 50 which will be described later on in the present specification via a lowpass filter 47, a de-emphasis circuit 48 and a noise cancelling circuit 49.

Reproduced first frequency division multiplexed signals from the heads $H_{L1}$ and $H_{L2}$ are alternately obtained for every one field and are supplied to respective pre-amplifiers 51-1 and 51-2 via respective rotary transformers (not shown). Amplified reproduced first frequency division multiplexed signals from the pre-amplifiers 51-1 and 51-2 are supplied to a switch S2 which is switched over for every one field, and a reproduced first frequency division multiplexed signal from the switch S2 is supplied to a highpass filter 52 and a lowpass filter 53 via the switch 41. A reproduced first FM color difference signal having the frequency spectrum I shown in FIG. 2(B) is filtered and obtained from the highpass filter 52. The reproduced first FM color difference signal is passed through a first limiter 54 and a second limiter and frequency demodulator 55 and is demodulated into a reproduced color difference signal R−Y. A lowpass filter 56 eliminates the carrier from the reproduced color difference signal R−Y, and an output signal of the lowpass filter 56 is supplied to a de-emphasis circuit 57 which carries out a de-emphasis complementary to the pre-emphasis carried out in the pre-emphasis circuit 24, by attenuating the high frequency components. An output signal of the de-emphasis circuit 57 is passed through a noise cancelling circuit 58 which cancels noise by use of the correlation in the horizontal scanning lines, and is supplied to the matrix circuit 50.

On the other hand, a reproduced second FM color difference signal having the frequency spectrum II shown in FIG. 2(B) is filtered and obtained from the lowpass filter 53. The reproduced second FM color difference signal is passed through a first limiter 59 wherein the level deviation is eliminated and is supplied to a carrier shifter 60 which frequency-converts the reproduced second FM color difference signal (that is, shifts the carrier) so that the frequency band thereof does not overlap a frequency band of a demodulated signal that is obtained by demodulating the reproduced second FM color difference signal. An output signal of the carrier shifter 60 is passed through a second limiter and frequency demodulator 61 and is demodulated into a reproduced color difference signal B−Y. The reproduced color difference signal B−Y is supplied to the matrix circuit 50 via a lowpass filter 62, a de-emphasis circuit 63 and a noise cancelling circuit 64.

The matrix circuit 50 performs a matrix operation and produces primary color signals of red (R), green (G) and blue (B) from the reproduced luminance signal and the two kinds of color difference signals R−Y and B−Y. The red, green and blue primary color signals are outputted via respective output terminals 65, 66 and 67. The matrix circuit 50 also produces a composite synchronizing signal, and this composite synchronizing signal is outputted via an output terminal 68. A difference in the recording timings of the luminance signal and the color difference signals is a tolerable difference within the vertical blanking period, and it is possible to match the timings of the reproduced luminance signal and the reproduced color difference signals by appropriately changing the head switching timing within this period.

Next, when playing the tape 37 which has the standard mode track pattern shown in FIG. 4B, the tape 37 is transported at a tape transport speed identical to that at the time of the recording. As described before, the switches 40 and 41 are connected to the respective contacts b, and the switch 42 is connected to the contact a. Reproduced second frequency division multiplexed signals from the heads $H_{S1}$ and $H_{S2}$ obtained by successively scanning the tracks $T_{S1}$, $T_{S2}$, $T_{S3}$ and the like are alternately supplied to the respective pre-amplifiers 43-1 and 43-2 via the respective rotary transformers. Amplified reproduced second frequency division multiplexed signals from the pre-amplifiers 43-1 and 43-2 are supplied to the switch S1, and a reproduced second frequency division multiplexed signal from the switch S1 is supplied to a reproducing circuit 69 via the switches 40 and 42. The reproducing circuit 69 is known, and obtains a reproduced color video signal from the reproduced second frequency division multiplexed signal which comprises the FM luminance signal and the frequency converted carrier chrominance signal by known signal processing means. The reproduced color video signal is outputted via an output terminal 70, and the reproduction in the standard mode is carried out in this manner.

Next, when playing the tape 37 having the extended mode track pattern shown in FIG. 4C, the tape 37 is transported at a slow tape transport speed identical to that at the time of the recording. As described before, the switches 40 through 42 are connected to the respective contacts b. Reproduced second frequency division multiplexed signals from the heads $H_{L1}$ and $H_{L2}$ obtained by successively scanning the tracks $T_{L1}$, $T_{L2}$, $T_{L3}$ and the like are alternately supplied to the respective pre-amplifiers 51-1 and 51-2 via the respective rotary transformers. Amplified reproduced second frequency division multiplexed signals from the pre-amplifiers 51-1 and 51-2 are supplied to the switch S2, and a reproduced second frequency division multiplexed signal from the switch S2 is supplied to the reproducing circuit 69 via the switches 41 and 42. The reproduced color video signal is outputted via the output terminal 70, and the reproduction in the extended mode is carried out in this manner.

The present invention is not limited to the embodiment described heretofore, and for example, the switch 19 may be provided between the frequency modulator 17 and the recording amplifier 18, and a single recording amplifier may be used in common for the recording amplifier 18 and a recording amplifier within the recording circuit 35. In addition, the heads $H_{S1}$ and $H_{L2}$ may have gaps with the same azimuth angle and the heads $H_{L1}$ and $H_{S2}$ may have gaps with different azimuth angles. Furthermore, it is possible to use the heads $H_{L1}$ and $H_{L2}$ during the recording and reproduction in the standard mode.

Figure 6:
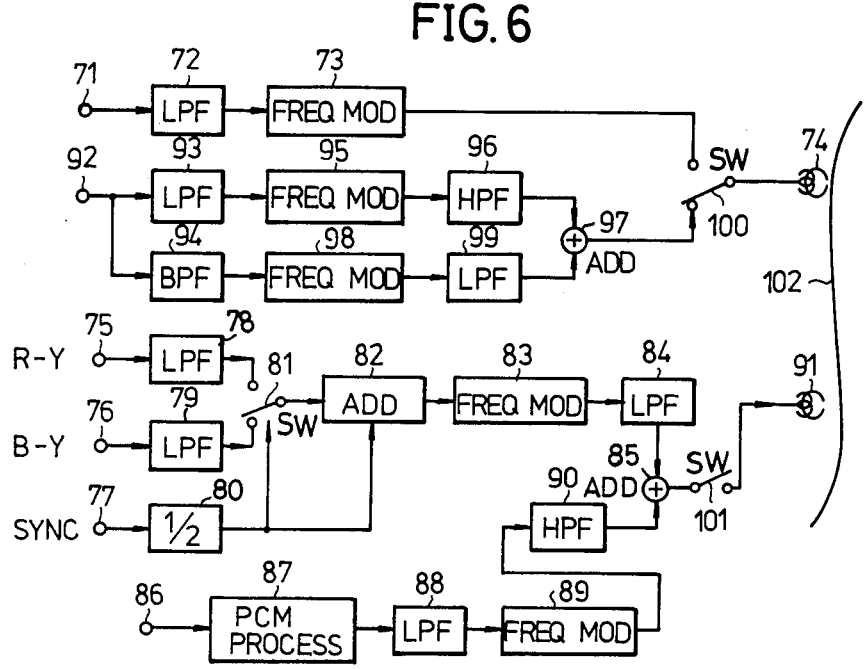
FIG. 6 is a system block diagram showing a second embodiment of the magnetic recording apparatus according to the present invention.
Figure 7:
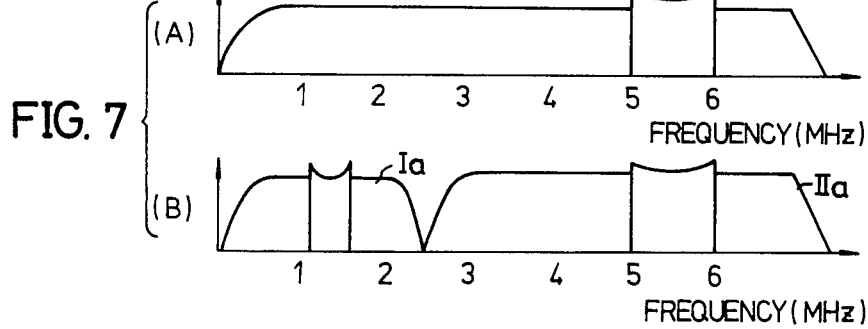
FIGS. 7(A) and 7(B) show frequency spectrums of signals at essential parts of the block system shown in FIG. 6.

Next, description will be given with respect to a second embodiment of the magnetic recording apparatus according to the present invention, by referring to FIGS. 6 through 8. In FIG. 6, a luminance signal from a color television camera or a luminance signal separated from a composite color video signal, for example, is applied to an input terminal 71. The luminance signal signal from the input terminal 71 is supplied to a lowpass filter 72 wherein the frequency band thereof is limited to an upper limit frequency of 4 MHz, for example, and is thereafter frequency-modulated into an FM luminance signal in a frequency modulator 73. This FM luminance signal has a carrier deviation band of 5 MHz to 6 MHz as shown in FIG. 7(A). The FM luminance signal is passed through a recording amplifier (not shown), a switch 100 which will be described later and rotary transformers (not shown), and is supplied to first rotary magnetic heads 74. There is no need to provide a highpass filter on the output side of the frequency modulator 73. On the other hand, a carrier chrominance signal obtained from the color television camera or a carrier chrominance signal separated from the composite color video signal is supplied to a synchronization detector (not shown) which obtains the color difference signals R−Y and B−Y from the carrier chrominance signal. The synchronization detector may be a part of the color television camera or a part of the block system shown in FIG. 6. The color difference signals R−Y and B−Y from the synchronization detector are applied to respective input terminals 75 and 76 and are supplied to respective lowpass filters 78 and 79 wherein the frequency bands thereof are limited and are supplied to a switching circuit 81. On the other hand, a horizontal synchronizing signal obtained from the color television camera or a horizontal synchronizing signal separated from the composite color video signal is applied to an input terminal 77 and is frequency-divided by ½ in a frequency divider 80. An output symmetrical square wave signal of the frequency divider 80 having a period of 2 H, where H denotes one horizontal scanning period, is supplied to the switching circuit 81 as a switching signal and is also supplied to an adder 82.

Accordingly, a line-sequential color difference signal in which the color difference signals R−Y and B−Y are alternately transmitted in time-sequence for every 1 H is obtained from the switching circuit 81. The line-sequential color difference signal is supplied to the adder 82 and is added with a D.C. component from the frequency divider 80 which occurs for every other 1 H. This D.C. component is added to the line-sequential color difference signal so that the color difference signals R−Y and B−Y can be discriminated from each other at the time of the reproduction. The the D.C component which is added has such a level that the frequency becomes in the order of 100 kHz after the frequency modulation. A line-sequential color difference signal from the adder 82 frequency-modulates a low-frequency carrier in a frequency modulator 83, and an FM line-sequential color difference signal having a frequency spectrum Ia shown in FIG. 7(B) is obtained from the frequency modulator 83. The FM line-sequential color difference signal is passed through a lowpass filter 84 and is supplied to an adder 85.

On the other hand, right-channel and left-channel analog audio signals applied to input terminals 86 are supplied to a PCM processor 87 and are subjected to a pulse code modulation in accordance with a known standard set by the EIAJ and added with a composite synchronizing signal so as to produce a PCM audio signal. This PCM audio signal has a signal format similar to that of the composite video signal so that the PCM audio signal can be recorded and reproduced on the existing VTR. The output PCM audio signal of the PCM processor 87 is passed through a lowpass filter 88 having a cutoff frequency of 2.5 MHz and is supplied to a frequency modulator 89. The PCM audio signal frequency-modulates a high-frequency carrier in the frequency modulator 89, and an FM PCM audio signal having a carrier deviation band of 5 MHz to 6 MHz as indicated by IIa in FIG. 7(B) is obtained from the frequency modulator 89. The FM PCM audio signal is passed through a highpass filter 90 so as to sufficiently eliminate an unwanted low frequency component and is supplied to the adder 85. The adder 85 frequency-division-multiplexes the FM line-sequential color difference signal and the FM PCM audio signal and obtains a frequency division multiplexed signal having a frequency allocation shown in FIG. 7(B). The output frequency division multiplexed signal of the adder 85 is passed through a recording amplifier (not shown), a switch 101 which will be described later and rotary transformers (not shown) and is supplied to second rotary magnetic heads 91.

As in the case of the standard mode heads $H_{S1}$ and $H_{S2}$ shown in FIG. 3, the first heads 74 are constituted a pair of rotary magnetic heads 74a and 74b mounted at mutually opposing positions on the rotary body. Similarly, as in the case of the extended mode heads $HL_1$ and $H_{L2}$ shown in FIG. 3, the second heads 91 are constituted by a pair of rotary magnetic heads 91a and 91b mounted at mutually opposing positions on the rotary body lagging the respective heads 74a and 74b along the rotating direction of the rotary body by a recording wavelength of 7 H, for example. Unlike in the first embodiment, however, the heads 74a, 74b, 91a and 91b have the same track width.

On the other hand, a standard television system composite color video signal is applied to an input terminal 92 shown in FIG. 6 and is supplied to a lowpass filter 93 and to a bandpass filter 94. A luminance signal separated from the composite color video signal in the lowpass filter 93 is frequency-modulated into an FM luminance signal in a frequency modulator 95. A carrier chrominance signal separated from the composite color video signal in the bandpass filter 94 is frequency-converted into a frequency band lower than a frequency band of the FM luminance signal in a frequency converter 98. The FM luminance signal is supplied to an adder 97 via a highpass filter 96, and the frequency converted carrier chrominance signal is supplied to the adder 97 via a lowpass filter 99.

Accordingly, a frequency division multiplexed signal which comprises the FM luminance signal and the frequency converted carrier chrominance signal and is in accordance with the low band conversion color recording and reproducing system is obtained from the adder 97 and is supplied to the switch 100. The switch 100 selectively supplies to the first heads 74 the FM luminance signal from the frequency modulator 73 or the frequency division multiplexed signal from the adder 97.

The switch 101 which is provided on the output side of the adder 85 is turned ON when the switch 100 selectively passes the output FM luminance signal of the frequency modulator 73. On the other hand, the switch 101 is turned OFF when the switch 100 selectively passes the output frequency division multiplexed signal of the adder 97.

Figure 8A:
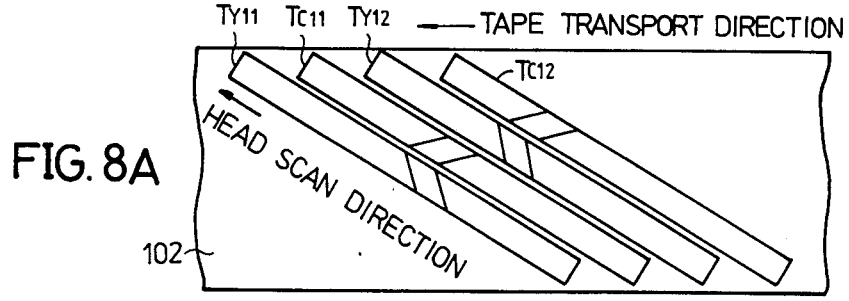
FIGS. 8A and 8B show embodiments of the track pattern formed on the magnetic tape in the magnetic recording apparatus shown in FIG. 6.

Therefore, in the case where the switch 100 selectively passes the output FM luminance signal of the frequency modulator 73 and the switch 101 is turned ON, a track $T_{Y11}$ is formed on a magnetic tape 102 as shown in FIG. 8A by the head 74a during a certain one field period, and at the same time, a track $T_{C11}$ is formed on the tape 102 by the head 91a. During a one field period next to the certain one field period, tracks $T_{Y12}$ and $T_{C12}$ are formed on the tape 102 by the respective heads 74b and 91b at the same time. For example, the tracks $T_{Y11}$, $T_{Y12}$, $T_{C11}$ and $T_{C12}$ have a track with of 27 microns, and these tracks are formed with a track pitch of 58 microns.

Figure 8B:
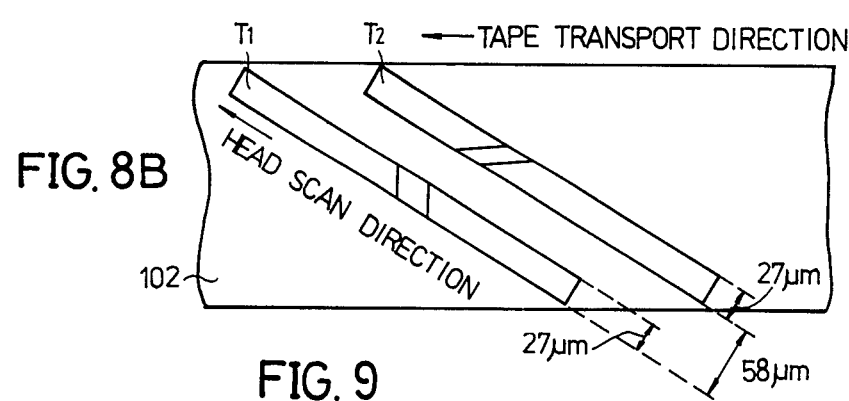

On the other hand, in the case where the switch 100 selectively passes the output frequency division multiplexed signal of the adder 97 and the switch 101 is turned OFF, no signal is supplied to the heads 91, and the output frequency division multiplexed signal of the adder 97 is supplied to the heads 74 (74a and 74b). In this case, the heads 74 alternately record on the tape 102 the frequency division multiplexed signal comprising the FM luminance signal and the frequency converted carrier chrominance signal, and tracks T1, T2 and the like are successively formed on the tape 102 as shown in FIG. 8B. These tracks are formed with a track pitch of 58 microns which is identical to that of the existing VTR employing the low band conversion color recording and reproducing system.

Next, description will be given with respect to a reproducing system which reproduces the signals recorded on the magnetic tape by the magnetic recording apparatus shown in FIG. 6, by referring to FIG. 9. A switch 104 is provided in a transmission path for the reproduced signals from the heads 74, and a switch 105 is provided in a transmission path for the reproduced signals from the heads 91. In the case where the tape 102 has the track pattern shown in FIG. 8A, the switch 104 is connected to a terminal a so as to selectively supply the reproduced signal to a frequency demodulator 106, and the switch 105 is turned ON. On the other hand, in the case where the tape 102 has the track pattern shown in FIG. 8B or the track pattern formed by the existing VTR employing the low band conversion color recording and reproducing system, the switch 104 is connected to a terminal b so as to selectively supply the reproduced signal to a highpass filter 107 and to a lowpass filter 108, and the switch 105 is turned OFF.

First, description will be given with respect to the reproducing operation in the case where the tape 102 has the track pattern shown in FIG. 8A. In this case, two parallel tracks on the tape 102 are scanned by one of the heads 74 and one of the heads 91, and signals are independently but simultaneously reproduced from the two parallel tracks. The other of the heads 74 and the other of the heads 91 are used to reproduce signals from the next two parallel tracks on the tape 102. The reproduced FM luminance signals from the heads 74 are formed into a continuous reproduced FM luminance signal and is frequency-demodulated in the frequency demodulator 106 and the carrier thereof is eliminated in a lowpass filter 109. A reproduced luminance signal from the lowpass filter 109 is supplied to an output terminal 110 and to a synchronizing signal separating circuit 111. It is not essential to provide a highpass filter on the input side of the frequency demodulator 106.

On the other hand, the reproduced frequency division multiplexed signal having the frequency allocation shown in FIG. 7(B) is obtained from the heads 91 (91a and 91b) and is supplied to a lowpass filter 112 and to a highpass filter 113. The lowpass filter 112 separates and obtains a reproduced FM line-sequential color difference signal from the frequency division multiplexed signal, and the highpass filter 113 separates and obtains a reproduced FM PCM audio signal from the frequency division multiplexed signal. The reproduced FM line-sequential color difference signal is passed through a frequency demodulator 114 and a lowpass filter 115 and is formed into a reproduced line-sequential color difference signal. The reproduced line-sequential color difference signal from the lowpass filter 115 is supplied to an R−Y discriminating circuit 116, a 1 H delay circuit 117 and switching circuits 118 and 119. The R−Y discriminating circuit 116 detects the D.C. level of the reproduced line-sequential color difference signal from the lowpass filter 115 based on the reproduced composite synchronizing signal from the synchronizing signal separating circuit 111, and discriminates a transmission period in which the color difference signal R−Y is transmitted. For example, when the D.C. component described before is added at the time of the recording in the time periods which occur for every other 1 H and in which the color difference signal R−Y is transmitted, it is possible to obtain a pulse signal by sampling and holding the level of the reproduced line-sequential color difference signal during the time period of the horizontal synchronizing signal. In this case, the pulse signal has a high level during the transmission period in which the color difference signal R−Y of the reproduced line-sequential color difference signal is transmitted and has a low level during the transmission period in which the color difference signal B−Y of the reproduced line-sequential color difference signal is transmitted.

The pulse signal from the R−Y discriminating circuit 116 is supplied to the switching circuit 118 as a switching pulse signal. Furthermore, the pulse signal from the R−Y discriminating circuit 116 is passed through an inverter 120, and an output pulse signal of the inverter 120 is supplied to the switching circuit 119 as a switching pulse signal. The switching circuit 118 selectively supplies to an output terminal 122 a reproduced color difference signal B−Y obtained from the 1H delay circuit 117 during the transmission period of the color difference signal R−Y of the reproduced line-sequential color difference signal from the lowpass filter 115. During this transmission period, the switching circuit 119 selectively supplies to an output terminal 121 the reproduced color difference signal R−Y from the lowpass filter 115. During the next transmission period of 1 H in which the color difference signal B−Y of the reproduced line-sequential color difference signal from the lowpass filter 115 is transmitted, the switching circuit 118 selectively supplies to the output terminal 122 the reproduced color difference signal B−Y from the lowpass filter 115, and the switching circuit 119 selectively supplies to the output terminal 121 the reproduced color difference signal R−Y obtained from the 1 H delay circuit 117. As a result, the reproduced color difference signals R−Y and B−Y which have been adjusted of their timings are obtained from the reproduced line-sequential color difference signal and are simultaneously outputted via the output terminals 121 and 122.

On the other hand, the reproduced FM PCM audio signal from the highpass filter 113 is passed through a frequency demodulator 123 and a lowpass filter 124 and is demodulated into a reproduced PCM audio signal. The reproduced PCM audio signal which has the signal format of the composite video signal is supplied to a PCM processor 125 and is decoded back into the original analog audio signals by known signal processing means. The reproduced analog audio signals from the PCM processor 125 are supplied to output terminals 126.

Next, description will be given with respect to the reproducing operation in the case where the tape 102 has the track pattern shown in FIG. 8B. In this case, a continuous reproduced frequency division multiplexed signal which is obtained from output reproduced signals of the heads 74 shown in FIG. 9 is passed through the switch 104 and is supplied to the highpass filter 107 and to the lowpass filter 108. The highpass filter 107 separates a reproduced FM luminance signal from the reproduced frequency division multiplexed signal, and the lowpass filter 108 separates a reproduced frequency converted carrier chrominance signal from the reproduced frequency division multiplexed signal. The reproduced FM luminance signal from the highpass filter 107 is passed through a frequency demodulator 127 and a lowpass filter 128 and is demodulated into a reproduced luminance signal, and this reproduced luminance signal is supplied to an adder 129. The reproduced frequency converted carrier chrominance signal from the lowpass filter 108 is passed through a frequency converter 130 and a bandpass filter 131 and is converted into a reproduced carrier chrominance signal in the original frequency band, and this reproduced carrier chrominance signal is supplied to the adder 129. Thus, a reproduced color video signal is obtained from the adder 129 and is supplied to an output terminal 132. Since the switch 105 is turned OFF in this state, the reproduced signals from the heads 91 are not used.

According to the present embodiment, it is possible to arbitrarily select the recording and reproducing system from the Y/C separation recording and reproducing system and the low band conversion color recording and reproducing system employed in the existing VTR. The heads 74 and 91 are used when the Y/C separation recording and reproducing system is selected, and the heads 74 are used when the low band conversion color recording and reproducing system is selected. It is possible to carry out the recording and reproduction with the track pattern obtained in the extended mode of the existing VTR, that is, with the track pattern having a track pitch of 19 microns, for example. The heads 74a, 74b, 91a and 91b must have gaps with azimuth angles identical to those of the rotary magnetic heads used in the existing VTR. In FIGS. 6 and 9, the illustration of an emphasis circuit, a non-linear emphasis circuit, a white clipping circuit, a dark clipping circuit, a recording amplifier, a pre-amplifier and the like is omitted in the signal transmission path which is used in the case where the Y/C separation recording and reproducing system is selected. When these circuits and the frequency modulator and demodulator shown in FIGS. 6 and 9 have characteristics identical to those of the corresponding circuits in the signal transmission path which is used in the case where the low band conversion color recording and reproducing system is selected, it is possible to use circuits in common for both the signal transmission path which is used when the Y/C separation recording and reproducing system is selected and the signal transmission path which is used when the low band conversion color recording and reproducing system is selected.

Figure 9:
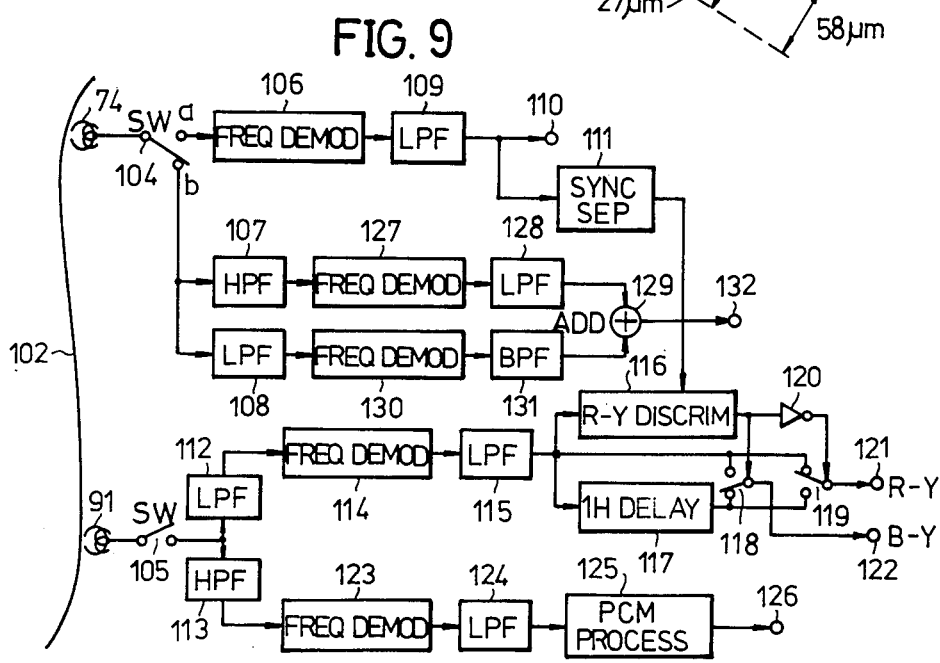
FIG. 9 is a system block diagram showing an example of a reproducing system for reproducing signals from the magnetic tape recorded in the magnetic recording apparatus shown in FIG. 6.

In FIG. 9, the reproduced FM line-sequential color difference signal is frequency-demodulated in the frequency demodulator 114. However, the reproduced FM line-sequential color difference signal has a low frequency as indicated by the frequency spectrum Ia in FIG. 7(B). When taking into account the interference caused by the demodulated signal which is obtained by demodulating the reproduced FM line-sequential color difference signal, it is desirable to frequency-convert the reproduced FM line-sequential color difference signal into a high frequency band before the frequency demodulation is performed so that the frequency band of the reproduced FM line-sequential color difference signal and the frequency band of the demodulated signal thereof do not overlap each other.

In FIG. 6, a composite synchronizing signal is included in the output signal of the PCM processor 87. However, when the servo system of the block system shown in FIG. 6 is controlled by the composite synchronizing signal of the video signal in the case where the composite synchronizing signal in the output signal of the PCM processor 87 is not synchronized to the composite synchronizing signal of the video signal, the head switching points where the signals supplied to the heads 74 and 91 are switched may occur at the data part of the PCM audio signal. In such a case, the data part of the PCM audio signal will be lost. For this reason, it is desirable to operate the PCM processor 87 responsive to the composite synchronizing signal of the video signal so that the composite synchronizing signal in the output signal of the PCM processor 87 becomes synchronized to the composite synchronizing signal of the video signal. In addition, since the FM PCM audio signal occupies a frequency band higher than that of the FM line-sequential color difference signal as indicated by the frequency spectrum IIa in FIG. 7(B), it is possible to record the FM PCM audio signal by the so-called after-recording in which the FM PCM audio signal is recorded on a magnetic tape which is pre-recorded with signals. That is, when it is assumed that one of the two parallel tracks which are formed simultaneously is recorded with the FM luminance signal by the head 74 and the other is recorded with at least the FM line-sequential color difference signal in a deep portion of the magnetic layer of the tape 102 by the head 91, it is possible to record the FM PCM audio signal by the head 91 over this other track in a surface portion of the magnetic layer of the tape 102 by the after-recording. Circuits may be additionally provided so as to carry out such an after-recording.

Figure 10:
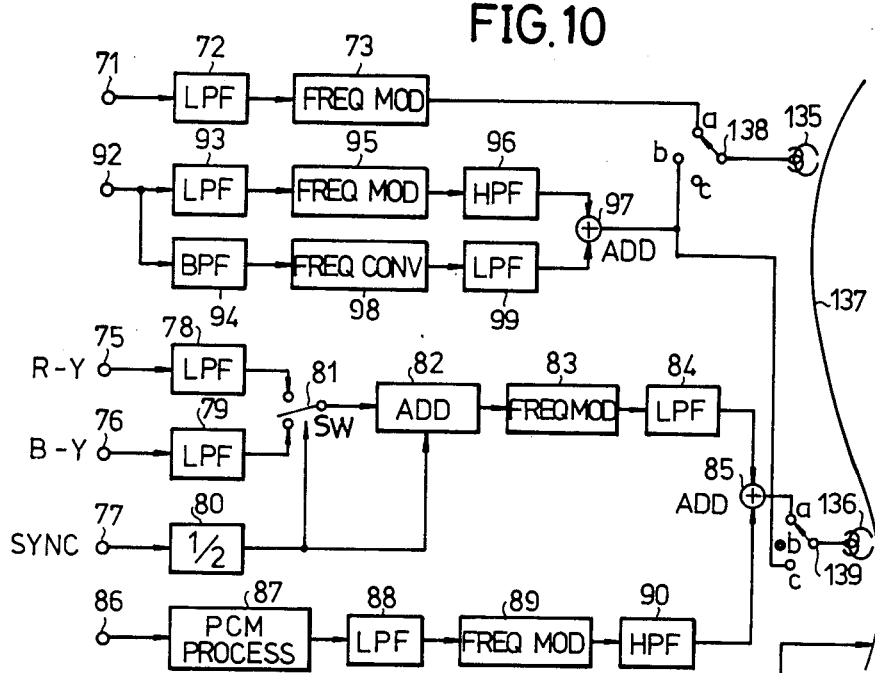
FIG. 10 is a system block diagram showing a third embodiment of the magnetic recording apparatus according to the present invention.

Next, description will be given with respect to a third embodiment of the magnetic recording apparatus according to the present invention, by referring to FIG. 10. In FIG. 10, those parts which are the same as those corresponding parts in FIG. 6 are designated by the same reference numerals, and description thereof will be omitted. According to the present embodiment, it is possible to carry out the recording by arbitrarily selecting the recording system from among three systems, that is, the Y/C separation recording system, the low band conversion color recording system with the standard mode and the low band conversion color recording system with the extended mode. Unlike in the second embodiment described before, rotary magnetic heads 135 and 136 have mutually different track widths, and the tape transport speed of a magnetic tape 137 is set to an optimum tape transport speed for each of the selected recording systems, so that it is possible to carry out even more satisfactory recording and reproduction.

The heads 135 correspond to the heads 74, and the heads 136 correspond to the heads 91. The heads 135 are constituted by a pair of heads mounted at mutually opposing positions on the rotary body, and the heads 136 are constituted by a pair of heads mounted at mutually opposing positions on the rotary body. The heads 135 have a track width of 47 microns, for example, and the heads 136 have a track width of 27 microns, for example. In addition, the mounting positions and azimuth angles of the heads 135 are identical to those of the heads $H_{S1}$ and $H_{S2}$ described before, and the mounting positions and the azimuth angles of the heads 136 are identical to those of the heads $H_{L1}$ and $H_{L2}$.

Switches 138 and 139 shown in FIG. 10 and switches 140 and 141 shown in FIG. 11 which will be described later respectively are three-position switches having three contacts a, b and c. These switches are connected to the respective contacts a in an a-mode in which the recording and reproduction are carried out in accordance with the Y/C separation recording and reproducing system. These switches are connected to the respective contacts b in a b-mode in which the recording and reproduction are carried out in accordance with the low band conversion color recording and reproducing system in the standard mode. Furthermore, these switches are connected to the respective contacts c in a c-mode in which the recording and reproduction are carried out in accordance with the low band conversion color recording and reproducing system in the extended mode. In the b-mode, the tape 137 is transported at a predetermined tape transport speed which is identical to that in the standard mode of the existing VTR. In the a-mode, the tape 137 is transported at a high tape transport speed which is twice the predetermined tape transport speed, for example. In the c-mode, the tape 137 is transported at a low tape transort speed which is slower than the predetermined tape transport speed and is identical to that in the extended mode of the existing VTR.

Accordingly, in the a-mode, the FM luminance signal which has the wide frequency band and is obtained from the frequency modulator 73 is supplied to the heads 135 via the switch 138. On the other hand, the first frequency division multiplexed signal which comprises the FM line-sequential color difference signal and the FM PCM audio signal and is obtained from the adder 85 is supplied to the heads 136 via the switch 139. The tape 137 is transported at the high tape transport speed by a tape transport mechanism 133 which operates responsive to a mode control signal from a terminal 134. For example, tracks are formed on the tape 137 with a track pitch of 116 microns, and a track pattern identical to that shown in FIG. 4A is formed on the tape 137.

In the b-mode, the second frequency division multiplexed signal which comprises the FM luminance signal and the frequency converted carrier chrominance signal and is obtained from the adder 97 is supplied to the heads 135 via the switch 138. On the other hand, the supply of the output signal of the adder 85 to the heads 136 is cut off by the switch 139. Hence, the heads 136 stop the recording operation. The tape transport mechanism 133 transports the tape 137 at the predetermined tape transport speed identical to that in the standard mode of the existing VTR, and tracks are formed on the tape 137 with a track pitch of 58 microns, for example. As a result, a track pattern identical to that shown in FIG. 4B is formed on the tape 137.

In the c-mode, no signal is supplied to the heads 135, and the second frequency division multiplexed signal is supplied to only the heads 136 via the switch 139. The tape transport mechanism 133 transports the tape 137 at the slow tape transport speed identical to that in the extended mode of the existing VTR, and tracks are formed on the tape 137 with a track pitch of 19 microns, for example. Hence, tracks $T_{L1}$, $T_{L2}$, $T_{L3}$ and the like having the track width of 19 microns and shown in FIG. 4C are successively formed on the tape 137 by the heads 136 for every one field, that is, a track pattern identical to that shown in FIG. 4C is formed on the tape 137.

Next, description will be given with respect to the reproducing system, by referring to FIG. 11. In FIG. 11, those parts which are the same as those corresponding parts in FIGS. 9 and 10 are designated by the same reference numerals, and description thereof will be omitted. In the case where the tape 137 has the track pattern shown in FIG. 4A, the switches 140 and 141 are connected to the respective contacts a so as to put the reproducing system in the a-mode. As a result, the reproduced luminance signal, the reproduced color difference signals and the reproduced audio signal of high quality are obtained by operations similar to those described before in conjunction with FIG. 1. On the other hand, in the case where the tape 137 has the track pattern shown in FIG. 4B, the reproducing system is put into the b-mode, and only the reproduced signal from the heads 135 is passed through the switch 140 and is supplied to the highpass filter 107 and to the lowpass filter 108. Further, in the case where the tape 137 has the track pattern shown in FIG. 4C, the reproducing system is put into the c-mode, and only the reproduced signal from the heads 136 is passed through the switch 141 and is supplied to the lowpass filter 107 and to the highpass filter 108. In the c-mode, it is possible to suppress the crosstalk from the adjacent track by carrying out the recording and reproduction with the heads 136 having the narrower track width.

As in the case of the second embodiment, those circuits which are provided in the three signal transmission paths and have the same characteristic may be replaced by circuits which are used in common for the three signal transmission paths.

It is possible to arrange the FM line-sequential color difference signal in the high frequency band, arrange the FM PCM audio signal in the low frequency band, obtain a frequency division multiplexed signal of these two signals, and record and reproduce this frequency division multiplexed signal. In this case, the lowpass filter 84 should be replaced by a highpass filter, and the highpass filter 90 should be replaced by a lowpass filter.

Figure 12:
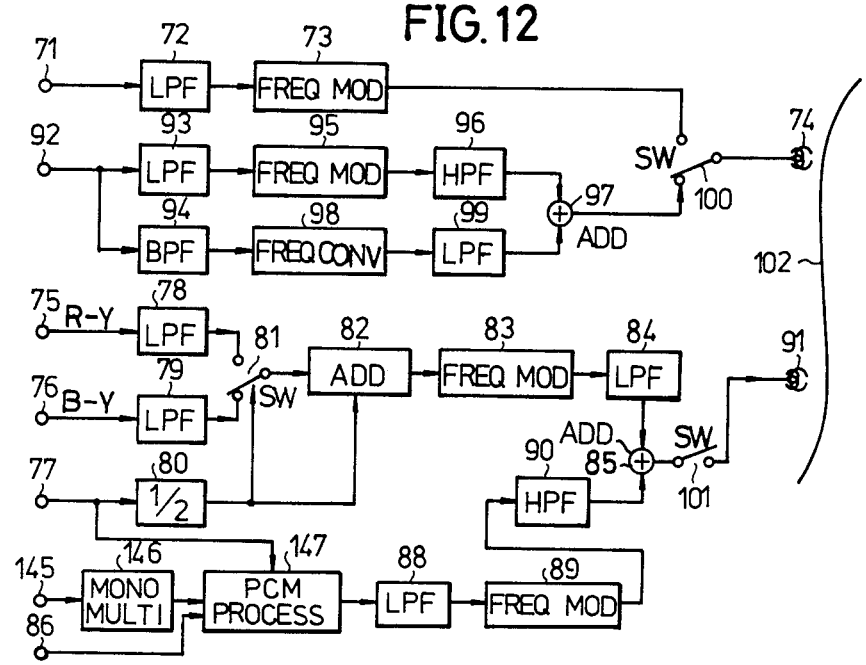
FIG. 12 is a system block diagram showing a fourth embodiment of the magnetic recording apparatus according to the present invention.

Next, description will be given with respect to a fourth embodiment of the magnetic recording apparatus according to the present invention, by referring to FIGS. 12 through 16. In FIG. 12, those parts which are the same as those corresponding parts in FIG. 6 will be designated by the same reference numerals, and description thereof will be omitted. According to the present embodiment, measures are taken so that the vertical synchronizing signals recorded by the heads 74 and the vertical synchronizing signals recorded by the heads 91 respectively exist at predetermined recorded positions on the tracks after the respective head switching points. In other words, the phase of the composite synchronizing signal of the video signal and the phase of the composite synchronizing signal which is to be frequency-division-multiplexed to the PCM audio signal are synchronized to each other with a relative time difference corresponding to the relative difference in the mounting positions of the heads 74 and the heads 91 on the rotary body.

When the head switching point of two heads mounted at mutually opposing positions on the rotary body occurs after the vertical synchronizing signal, the scanning timing of a horizontal synchronization system in a receiver is disturbed by the head switching noise at the time of the reproduction and the interlace becomes incomplete, and further, the head switching noise mixes into the vertical synchronizing signal and the picture becomes unstable in the vertical direction thereof. For these reasons, the head switching point is set a predetermined time period (for example, approximately 7H) before the recorded position of the vertical synchronizing signal, as is known. The first heads are mounted on the rotary body at positions close to the second heads, so that two parallel tracks can be formed simultaneously by one of the first heads and one of the second heads. However, since the mounting positions of the first and second heads are different, it is necessary to synchronize the phase of the composite synchronizing signal of the video signal and the phase of the composite synchronizing signal which is to be frequency-division-multiplexed to the PCM audio signal with the relative time difference corresponding to the relative difference in the mounting positions of the first and second heads on the rotary body. As a result, the recorded positions of the vertical synchronizing signals from the starting ends of the tracks recorded by the first heads and the recorded positions of the vertical synchronizing signals from the starting ends of the tracks recorded by the second heads respectively become the predetermined time period after the respective head switching points.

In FIG. 12, the vertical synchronizing signal obtained from the color television camera or the vertical synchronizing signal separated from the luminance signal within the composite color video signal is supplied to a monostable multivibrator 146 via an input terminal 145. A PCM processor 147 has a construction shown in FIG. 13. A delayed vertical synchronizing signal which has been delayed by a predetermined delay time in the monostable multivibrator 146 is applied to an input terminal 150 of the PCM processor 147. The delayed vertical synchronizing signal is supplied to a synchronizing signal generating circuit 151 together with the horizontal synchronizing signal obtained from the input terminal 77.

Figure 14:
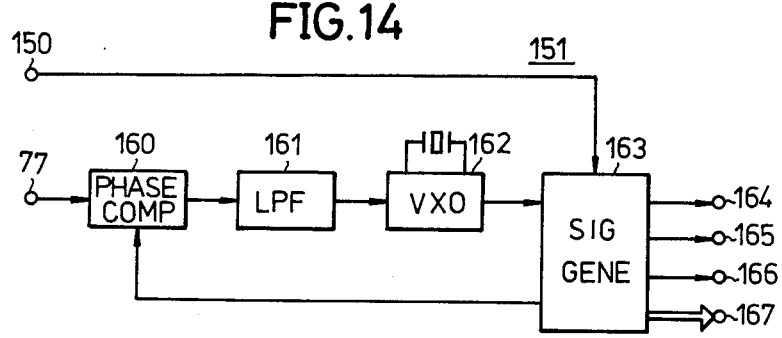
FIG. 14 is a system block diagram showing an embodiment of an essential part of the block system shown in FIG. 13.
Figure 15:
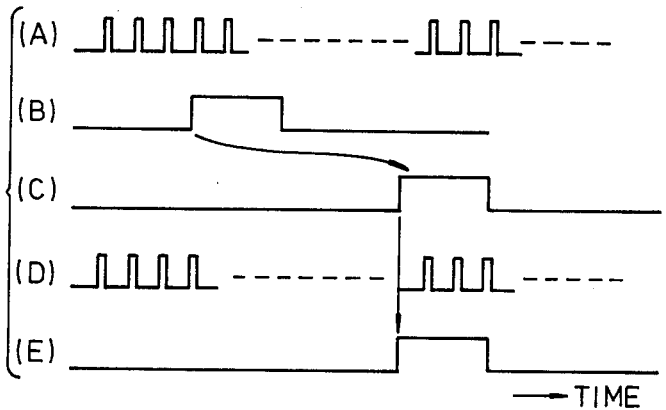
FIGS. 15(A) through 15(E) show signal waveforms for explaining the operation of the block system shown in FIG. 14.

FIG. 14 shows an embodiment of the synchronizing signal generating circuit 151. The horizontal synchronizing signal shown in FIG. 15(A) which is obtained from the input terminal 77 is supplied to a signal generating circuit 163 via a phase comparator 160, a lowpass filter 161 and a voltage controlled crystal oscillator 162. On the other hand, the vertical synchronizing signal shown in FIG. 15(B) is delayed in the monostable multivibrator 146 by the predetermined delay time, and the delayed vertical synchronizing signal shown in FIG. 15(C) is supplied to the signal generating circuit 163 via the input terminal 150. The delay time of the monostable multivibrator 146 is determined by the difference in the mounting positions of the heads 74 and 91. In the case where the heads 74 and 91 are mounted at the same height position but with an angular separation $\theta$ between the two adjacent heads 74 and 91, the delay time of the monostable multivibrator 146 can be described by $(\theta/180°) \times (1/fv)$, where fv denotes the field frequency of the video signal which is to be recorded. However, when the height positions of the heads 74 and 91 are different, it is necessary to determine the delay time of the monostable multivibrator 146 by also taking into account the difference in the height positions of the heads 74 and 91. In any case, the delay time should be selected so that the recorded positions of the vertical synchronizing signals from the starting ends of the tracks recorded by the heads 74 and the recorded positions of the vertical synchronizing signals from the starting ends of the tracks recorded by the heads 91 are respectively the predetermined time period after the respective head switching points.

Figure 16:
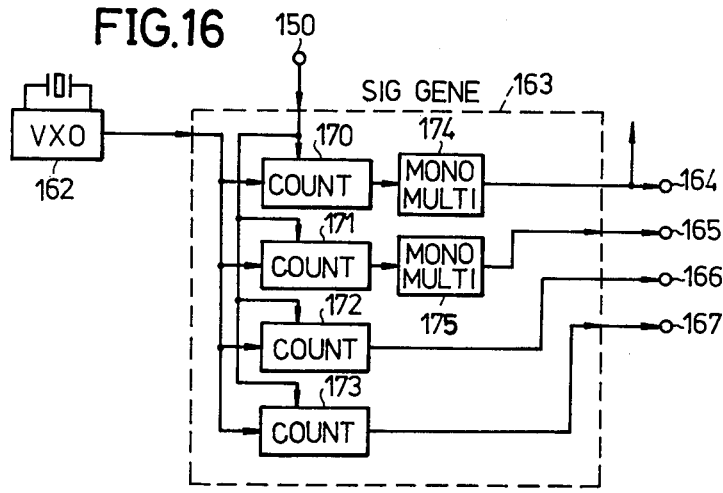
FIG. 16 is a system block diagram showing an embodiment of a signal generating circuit in the block system shown in FIG. 14.

The signal generating circuit 163 has a construction shown in FIG. 16. The signal generating circuit 163 comprises counters 170, 171, 172 and 173 which are supplied with the output signal of the oscillator 162, and monostable multivibrators 174 and 175. The counters 170, 171, 172 and 173 are reset by the delayed vertical synchronizing signal from the input terminal 150. When it is assumed that the output signal frequency of the oscillator 162 is 21 MHz, the frequency dividing ratios of the counters 170, 171, 172 and 173 are set to 1/1344, 1/352800, 1/480 and ⅛, respectively. An output signal of the counter 170 is supplied to the monostable multivibrator 174 wherein the pulse width thereof is adjusted and is converted into a horizontal synchronizing signal shown in FIG. 15(D). The output horizontal synchronizing signal of the monostable multivibrator 174 is supplied to an output terminal 164 and to the phase comparator 160 shown in FIG. 14 so as to constitute a phase locked loop (PLL).

An output signal of the counter 171 is supplied to the monostable multivibrator 175 wherein the pulse width thereof is adjusted and is converted into a vertical synchronizing signal shown in FIG. 15(E). The output vertical synchronizing signal of the monostable multivibrator 175 is supplied to an output terminal 165. An output signal of the counter 172 is supplied to an output terminal 166 as a high-frequency clock pulse signal for analog-to-digital conversion which is in phase synchronism with the horizontal synchronizing signal. An output signal of the counter 173 is supplied to an output terminal 167 as a pulse signal which is required for the write-in and read-out to and from a memory 155 shown in FIG. 13.

Figure 13:
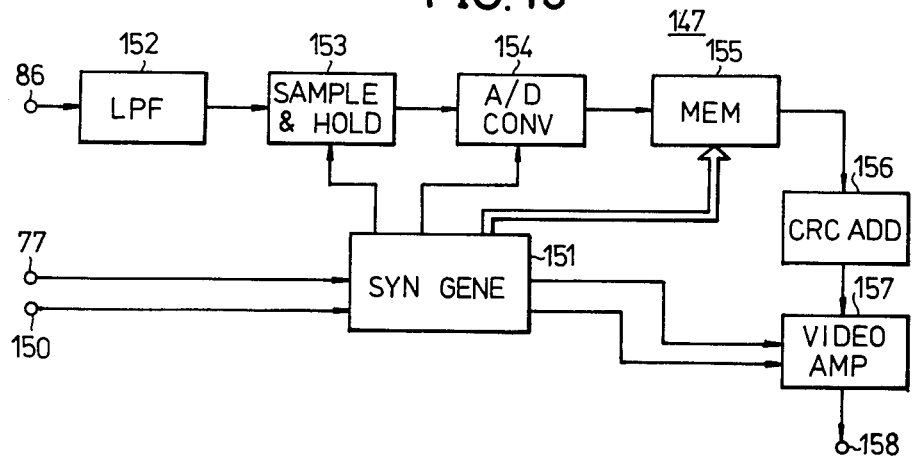
FIG. 13 is a system block diagram showing an embodiment of an essential part of the block system shown in FIG. 12.

In the PCM processor 147 shown in FIG. 13, the audio signals applied to the input terminals 86 are passed through a lowpass filter 152 for preventing aliasing noise, and are supplied to a sample and hold circuit 153 wherein the signals are sampled by a sampling pulse signal having a frequency of 44.056 kHz, for example, and held. Output signals of the sample and hold circuit 153 are subjected to an analog-to-digital conversion in an analog-to-digital (A/D) converter 154 based on a clock signal from the synchronizing signal generating circuit 151, and PCM signals having a quantization number of fourteen bits are obtained from the A/D converter 154. The PCM signals from the A/D converter 154 are supplied to the memory 155 wherein the PCM signals are time base compressed so that time periods are provided for the transmission of the composite synchronizing signal, an error detecting code and error correcting codes and so that the two channels of PCM signals can be alternately time-division-multiplexed, and an interleaving process is thereafter performed after adding the error correcting codes. An output digital signal of the memory 155 is supplied to a CRC adding circuit 156 which adds to the digital signal a cyclic redundancy check (CRC) code as the error checking code, and is thereafter supplied to a video amplifier 157. The video amplifier 157 time-division-multiplexes the composite synchronizing signal from the synchronizing signal generating circuit 151 to the digital signal which is added with the CRC code and the error correcting codes, and amplifies the time division multiplexed signal which is obtained. This amplified time division multiplexed signal is supplied to an output terminal 158 as a PCM audio signal having the composite synchronizing signal which is in phase synchronism with the composite synchronizing signal within the luminance signal which is recorded by the first heads 74.

The horizontal and vertical synchronizing signals supplied to the video amplifier 157 may be the horizontal and vertical synchronizing signals obtained from the input terminals 77 and 150. Such a method of obtaining a composite synchronizing signal which is synchronized to an external synchronizing signal, generating a timing pulse signal related to the composite synchronizing signal and generating clock signals by subjecting the timing pulse signal to a multiplication, is known. A circuit which uses such a method is used in a television camera.

Therefore, when the Y/C separation recording system is selected, the track pattern identical to that shown in FIG. 8A is formed on the tape 102. On the other hand, when the low band conversion color recording system is selected, a track pattern identical to that shown in FIG. 8B is formed on the tape 102. The reproducing system shown in FIG. 9 can be used to play the tape 102.

Figure 17:
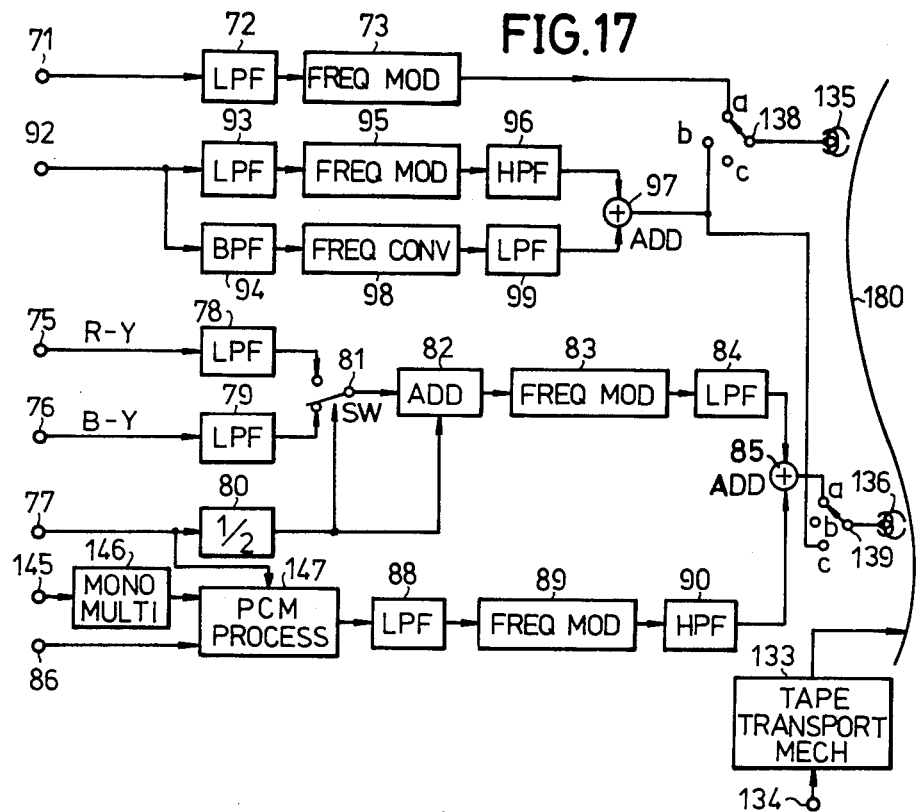
FIG. 17 is a system block diagram showing a fifth embodiment of the magnetic recording apparatus according to the present invention.

Next, description will be given with respect to a fifth embodiment of the magnetic recording apparatus according to the present invention, by referring to FIG. 17. In FIG. 17, those parts which are the same as those corresponding parts in FIGS. 10 and 12 are designated by the same reference numerals, and description thereof will be omitted. According to the recording system shown in FIG. 17, a track pattern identical to that shown in FIG. 4A is formed on a magnetic tape 180 in the a-mode. In this case, the FM PCM audio signal comprising the composite synchronizing signal is recorded on the tracks $T_{C1}$, $T_{C2}$ and the like together with the FM line-sequential color difference signal.

In the b-mode, a track pattern identical to that shown in FIG. 4B is formed on the tape 180. A track pattern identical to that shown in FIG. 4C is formed on the tape 180 in the c-mode.

Figure 11:
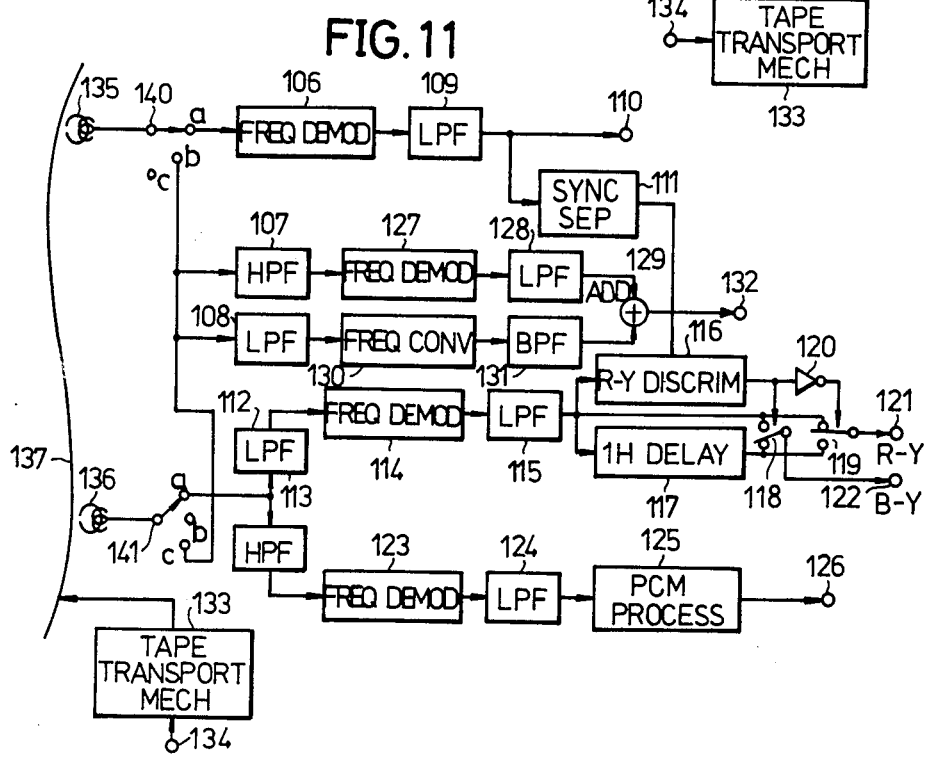
FIG. 11 is a system block diagram showing an example of a reproducing system for reproducing signals from the magnetic tape recorded in the magnetic recording apparatus shown in FIG. 10.

The recorded signals on the tape 180 may be reproduced by the reproducing system shown in FIG. 11.

In the above described embodiments, the second composite synchronizing signal within the PCM audio signal is synchronized to the first composite synchronizing signal within the luminance signal or the second frequency division multiplexed signal. But instead, it is possible to synchronize the first composite synchronizing signal to the second composite synchronizing signal. It is possible to synchronize the first composite synchronizing signal to the second composite synchronizing signal with ease by supplying the PCM audio signal to the television camera which is provided with the circuit described before.

Next, description will be given with respect to a sixth embodiment of the magnetic recording apparatus according to the present invention, by referring to FIGS. 18 through 21. In the present embodiment and a seventh embodiment which will be described later, the recording system may have the construction of any of the recording systems of the embodiments described heretofore. The present embodiment is characterized by the arrangement of the heads shown in FIG. 18.

Figure 18:
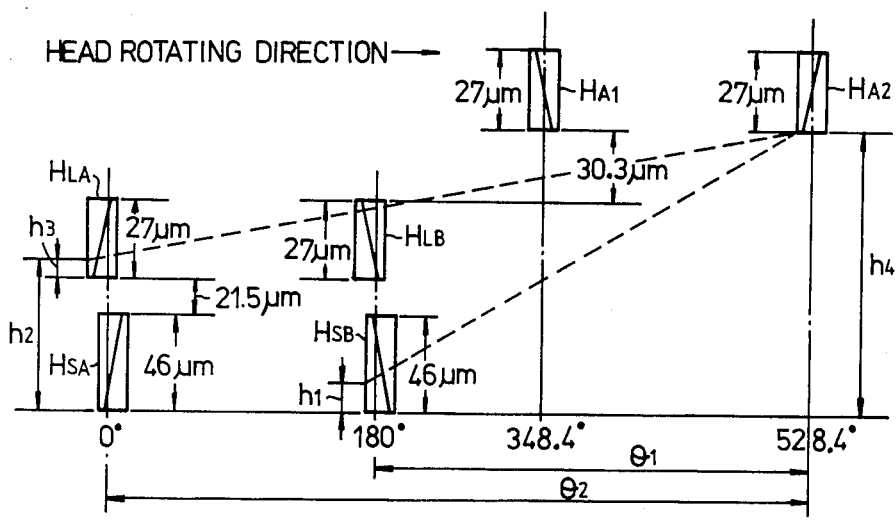
FIG. 18 shows the arrangement of the rotary magnetic heads on the rotary body in a sixth embodiment of the magnetic recording apparatus according to the present invention.

In FIG. 18, standard mode rotary magnetic heads $H_{SA}$ and $H_{SB}$ having a track width of 46 microns are mounted at mutually opposing positions on the rotational plane of the rotary body at the same height position along the axial direction of the rotary body. Extended (long-time) mode rotary magnetic heads $H_{LA}$ and $H_{LB}$ having a track width of 27 microns are mounted at mutually opposing positions on the rotational plane of the rotary body at the same height position. The lower ends of the extended mode heads $H_{LA}$ and $H_{LB}$ are 21.5 microns higher than the upper ends of the standard mode heads $H_{SA}$ and $H_{SB}$ in the axial direction of the rotary body. The head $H_{SA}$ is arranged close to and leading the head $H_{LA}$ in the rotating direction of the rotary body, and the head $H_{SB}$ is similarly arranged close to and leading the head $H_{LB}$ in the rotating direction of the rotary body.

Rotary magnetic heads $H_{A1}$ and $H_{A2}$ exclusively for recording the audio signal have a track width of 27 microns and are mounted at mutually opposing positions on the rotational plane of the rotary body. The lower ends of the heads $H_{A1}$ and $H_{A2}$ are 30.3 microns higher than the upper ends of the heads $H_{LA}$ and $H_{LB}$. The head $H_{A2}$ is mounted at a position leading a center position between the mounting positions of the heads $H_{LA}$ and $H_{SA}$ by an angle $\theta_2$ of 168.4° along the rotating direction of the rotary body. However, in FIG. 18, this angle $\theta_2$ is assumed to be substantially equal to the angle by which the head $H_{A2}$ leads the head $H_{LA}$ in the rotating direction of the rotary body, and this angle $\theta_2$ is shown as 528.4° (=168.4°+360°) for convenience' sake. Similarly, the head $H_{A1}$ is mounted at a position leading a center position between the mounting positions of the heads $H_{LB}$ and $H_{SB}$ by 168.4° along the rotating direction of the rotary body.

The heads $H_{SA}$, $H_{SB}$, $H_{LA}$, $H_{LB}$, $H_{A1}$ and $H_{A2}$ have gaps with azimuth angles identical to those of the rotary magnetic heads used in the existing VTR employing the low band conversion color recording and reproducing system. Accordingly, the heads $H_{SA}$ and $H_{LA}$ have gaps with the azimuth angle of +6°, the heads $H_{SB}$ and $H_{LB}$ have gaps with the azimuth angle of −6°, the head $H_{A1}$ has a gap with the azimuth angle of −30° and the head $H_{A2}$ has a gap with the azimuth angle of +30°.

Description will now be given for the case where the recording is carried out according to the Y/C separation recording system by use of the head arrangement shown in FIG. 18. In this case, the luminance signal having the frequency spectrum shown in FIGS. 2(A) or 7(A) is supplied to the heads $H_{SA}$ and $H_{SB}$, and the information signal having the frequency spectrum shown in FIGS. 2(B) or 7(B) and including at least the two kinds of FM color difference signals is supplied to the heads $H_{LA}$ and $H_{LB}$. At the same time, the magnetic tape is transported at a tape transport speed which is twice the tape transport speed of the standard mode. No signal is supplied to the heads $H_{A1}$ and $H_{A2}$ in this case.

Figure 19A:
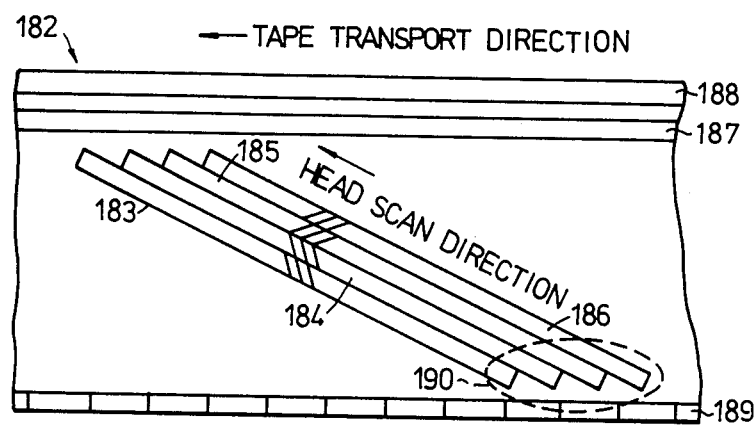
FIGS. 19A and 19B respectively show the track pattern formed in the sixth embodiment of the magnetic recording apparatus according to the present invention when the Y/C separation recording system is selected and a part of the track pattern on an enlarged scale.

Accordingly, as shown in FIG. 19A, the heads $H_{SB}$ and $H_{LB}$ simultaneously form tracks 183 and 184 on a magnetic tape 182 during a certain one field period, and the heads $H_{SA}$ and $H_{LA}$ simultaneously form tracks 185 and 186 during a one field period next to the certain one field period. Similarly thereafter, a luminance signal recording track and a color signal recording track are independently but simultaneously formed on the tape 182 for every one field period.

Figure 19B:
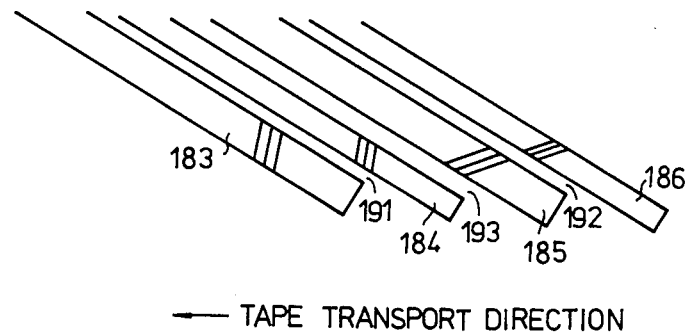

An encircled portion 190 of the track pattern shown in FIG. 19A is shown on an enlarged scale in FIG. 19B. A guard band 191 is formed between the tracks 183 and 184 which are formed simultaneously, and a guard band 192 is formed between the tracks 184 and 185 which are formed simultaneously. The guard bands 191 and 192 have a width of 21.5 microns. A guard band 193 having a width of 24.5 microns is formed between the tracks 184 and 185 which are formed in the two successive one field periods. The tracks 183 and 185 have a track width of 46 microns, and the tracks 184 and 186 have a track width of 27 microns, as may be readily understood from the head arrangement shown in FIG. 18.

In FIG. 19A, audio tracks 187 and 188 are formed in the upper end portion of the tape 182, and a control track 189 is formed in the lower end portion of the tape 182.

Next, description will now be given for the case where the recording is carried out according to the low band conversion color recording system in the standard mode. In this case, the second frequency division multiplexed signal comprising the FM luminance signal and the frequency converted carrier chrominance signal is supplied to only the heads $H_{SA}$ and $H_{SB}$, and the low-frequency FM audio signal is supplied to the heads $H_{A1}$ and $H_{A2}$. In addition, the magnetic tape is transported at the tape transport speed of the standard mode so that tracks are formed with a track pitch of 58 microns.

Figure 20:
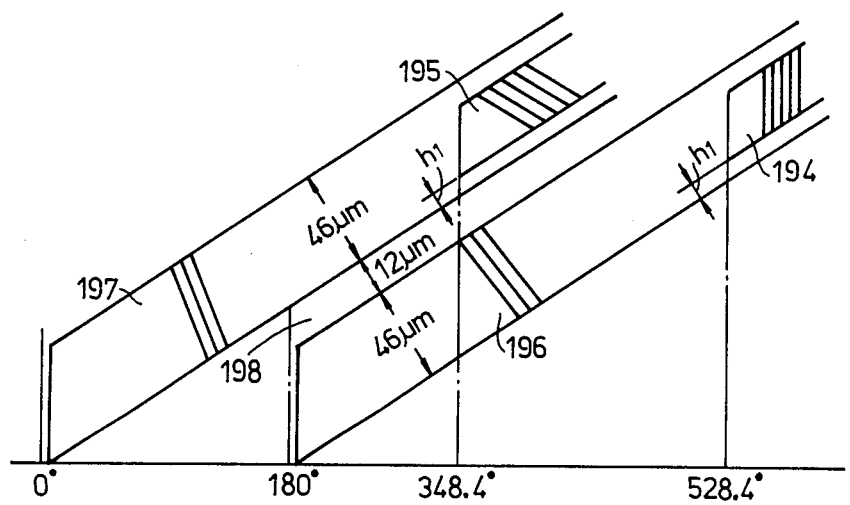
FIG. 20 shows on an enlarged scale a part of the track pattern formed in a standard mode of the sixth embodiment of the magnetic recording apparatus according to the present invention.

Accordingly, a track pattern shown in FIG. 20 is formed on the magnetic tape. FIG. 20 shows a portion of the track pattern on an enlarged scale. First, the head $H_{A2}$ which leads the heads $H_{SA}$ and $H_{LA}$ by 528.4° as shown in FIG. 18 records the FM audio signal in a deep portion of the magnetic layer of the magnetic tape by forming an audio track 194. Thereafter, the head $H_{A1}$ which leads the heads $H_{SA}$ and $H_{LA}$ by 348.4° as shown in FIG. 18 records the FM audio signal in a deep portion of the magnetic layer of the magnetic tape by forming an audio track 195. The head $H_{SB}$ which leads the head $H_{SA}$ by 180° records the second frequency division multiplexed signal by forming a video track 196, and the head $H_{SA}$ records one field period thereafter the second frequency division multiplexed signal by forming a video track 197.

The tracks 196 and 197 which have the track width of 46 microns are formed over the respective audio tracks 194 and 195 having the track width of 27 microns. However, since the FM luminance signal in the second frequency division multiplexed signal has a frequency higher than that of the FM audio signal and the non-saturated recording is carried out, the second frequency division multiplexed signal comprising the FM luminance signal and the frequency converted carrier chrominance signal is only recorded in a surface portion of the magnetic layer of the magnetic tape. As a result, the tracks 194 and 196 coexist in the same part of the magnetic tape in the deep portion and the surface portion of the magnetic layer, respectively. Similarly, the tracks 195 and 197 coexist in the same part of the magnetic tape in the deep portion and the surface portion of the magnetic layer, respectively. As shown in FIG. 20, a guard band 198 having a width of 12 microns is formed between the tracks 196 and 197. In FIG. 20 and FIGS. 21, 23, 24 and 25 which will be described later, the track pattern is viewed from a rear surface of the magnetic tape for convenience' sake, which rear surface is opposite to the side of magnetic tape provided with the magnetic layer. On the other hand, in FIGS. 4A through 4C, 8A, 8B, 19A and 19B, the track pattern is viewed from a front surface of the magnetic tape, which front surface is the side of the magnetic tape provided with the magnetic layer.

Next, description will be given for the case where the recording is carried out according to the low band conversion color recording system in the extended mode. In this case, the second frequency division multiplexed signal is only supplied to the heads $H_{LA}$ and $H_{LB}$, and the low-frequency FM audio signal is supplied to the heads $H_{A1}$ and $H_{A2}$. The magnetic tape is transported at the tape transport speed of the extended mode so that tracks are formed with a track pitch of 19 microns.

Figure 21:
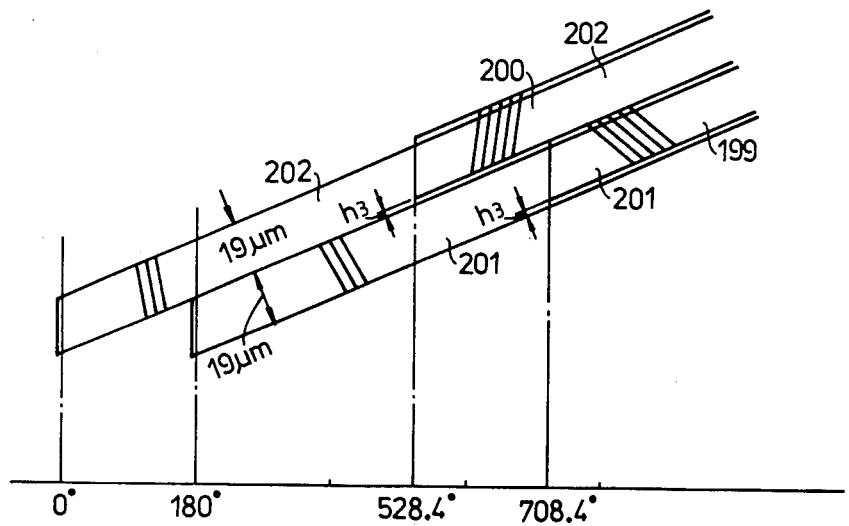
FIG. 21 shows on an enlarged scale a part of the track pattern formed in an extended (long-time) mode of the sixth embodiment of the magnetic recording apparatus according to the present invention.

Hence, a track pattern shown in FIG. 21 is formed on the magnetic tape. FIG. 21 shows a portion of the track pattern on an enlarged scale. The head $H_{A1}$ which leads the heads $H_{SA}$ and $H_{LA}$ by 708.4° records the FM audio signal in a deep portion of the magnetic layer of the magnetic tape by forming an audio track 199, and the head $H_{A2}$ similarly forms an audio tack 200. The head $H_{LB}$ which leads the head $H_{LA}$ by 180° records the second frequency division multiplexed signal in a surface portion of the magnetic layer of the magnetic tape, over the audio track 199, by forming a video track 201, and the head $H_{LA}$ similarly forms a video track in a surface portion of the magnetic layer of the magnetic tape, over the audio track 200.

During this extended mode, the tracks are formed by the heads $H_{LA}$ and $H_{LB}$ without a guard band and with a track pitch of 19 microns and the FM audio signal is recorded by the heads $H_{A1}$ and $H_{A2}$ in the deep portion of the magnetic layer of the magnetic tape. In other words, the track pattern shown in FIG. 4C is formed on the magnetic tape.

FIGS. 20 and 21 show the track patterns for the case where the video signal to be recorded is the NTSC system video signal. In this case, when the angle by which the heads $H_{A2}$ and $H_{A1}$ respectively lead the heads $H_{SB}$ and $H_{SA}$ in the standard mode is designated by $\theta_1$ as shown in FIG. 18, this angle $\theta_1$ is not limited to 348.4° shown in FIG. 18 and may be within a predetermined angular range. When the angle by which the heads $H_{A2}$ and $H_{A1}$ respectively lead the heads $H_{LA}$ and $H_{LB}$ in the extended mode is designated $\theta_2$ as shown in FIG. 18, this angle $\theta_2$ is also not limited to 708.4° shown in FIG. 21 because the angle $\theta_2$ can be described by $\theta_1 + 180°$.

Description will be given with respect to the ranges for the angles $\theta_1$ and $\theta_2$ by denoting a difference between the lower end of the video track and the lower end of the audio track in the standard mode by $h_1$ as shown in FIGS. 18 and 20, denoting a difference between the lower end of the video track and the lower end of the audio track in the extended mode by $h_3$ as shown in FIGS. 18 and 21, denoting a value obtained by adding to the difference $h_3$ the distance between the lower ends of the heads $H_{SA}$ and $H_{SB}$ and the lower ends of the heads $H_{LA}$ and $H_{LB}$ by $h_2$ as shown in FIG. 18, and denoting a height difference between the lower ends of the heads $H_{SA}$ and $H_{SB}$ and the lower ends of the heads $H_{A1}$ and $H_{A2}$ by $h_4$. The differences $h_1$ and $h_3$ are standardized to values which are under predetermined values.

In the present specification, a term "track moving quantity" will be used to refer to a moving quantity of the magnetic tape in the direction of the width of the tracks, that is, the moving quantity of the magnetic tape in a direction perpendicular to the longitudinal direction of the tracks. During the standard mode, a track moving quantity $D_1$ is 58 microns with respect to a 180° rotation of the rotary body. Hence, the following equation (1) stands.

$$D_1 = h_4 - h_1 - 58 \times (\theta_1/180) \qquad (1)$$

During the extended mode, a track moving quantity $D_2$ is 58/3 microns with respect to the 180° rotation of the rotary body, and the following equation (2) stands.

$$\begin{aligned} D_2 &= h_4 - h_2 \\ &= 58/3 \times (\theta_2/180) \end{aligned} \qquad (2)$$

-continued
$$= 58/3 \times (\theta_1 + 180)/180$$

The following equations (3) and (4) are obtained when the equations (1) and (2) are solved for $\theta_1$ and $h_4$.

$$\theta_1 = 270(h_2 - h_1)/58 + 90 \quad (3)$$

$$h_4 = (3h_2 - h_1)/2 + 58/2 \quad (4)$$

The angle $\theta_1$ satisfies the following relation (5) when $h_1$ and $h_2$ are selected so that the center of the video track and the center of the audio track substantially coincide during both the standard and extended modes.

$$332° < \theta_1 < 380° \quad (5)$$

However, from the practical point of view, it is desirable that the angle $\theta_1$ is under 360° when the time difference between the video and audio signals are taken into consideration. Hence, it is desirable that the angle $\theta_1$ satisfies the following relation (6).

$$332° < \theta_1 < 360° \quad (6)$$

On the other hand, when recording the PAL system video signal, $\theta_1 = \theta_2$. In addition, during the standard mode, the track moving quantity $D_1$ is 49 microns with respect to a 180° rotation of the rotary body. Hence, the following equation (7) stands.

$$D_1 = h_4 - h_1 = 49 \times (\theta_1/180) \quad (7)$$

During the extended mode, the track moving quantity $D_2$ is 49/2 microns with respect to the 180° rotation of the rotary body, and the following equation (8) stands.

$$D_2 = h_4 - h_2 \quad (8)$$
$$= 49/2 \times (\theta_2/180)$$
$$= 49/2 \times (\theta_1/180)$$

The following equations (9) and (10) are obtained when the equations (7) and (8) are solved for $\theta_1$ and $h_4$.

$$\theta_1 = 360(h_2 - h_1)/49 \quad (9)$$

$$h_4 = 2h_2 - h_1 \quad (10)$$

The angle $\theta_1$ satisfies the following relation (11) when $h_1$ and $h_2$ are selected so that the center of the video track and the center of the audio track substantially coincide durin both the standard and extended modes.

$$314° < \theta_1 < 472° \quad (11)$$

However, from the practical point of view, it is desirable that the angle $\theta_1$ is under 360° when the time difference between the video and audio signals are taken into consideration. Hence, it is desirable that the angle $\theta_1$ satisfies the following relation (12).

$$314° < \theta_1 < 360° \quad (12)$$

Next, description will be given with respect to the seventh embodiment of the magnetic recording apparatus according to the present invention, by referring to FIGS. 22 through 25. The present embodiment is characterized in that it is possible to record the FM audio signal in the deep portion of the magnetic layer of the magnetic tape even when carrying out the recording in accordance with the Y/C separation recording system.

In the head arrangement shown in FIG. 22, those parts which are the same as those corresponding parts in FIG. 18 are designated by the same reference numerals, and description thereof will be omitted. In FIG. 22, a rotary magnetic head $H_{AB}$ exclusively for recording the audio signal is mounted at a position leading a center position between the mounting positions of the heads $H_{LA}$ and $H_{SA}$ by 175.4° along the rotating direction of the rotary body, and the lower end of this head $H_{AB}$ is 31 microns higher than the upper ends of the heads $H_{LA}$ and $H_{LB}$. A rotary magnetic head $H_{AA}$ exclusively for recording the audio signal is mounted on the rotary body at an opposing position from the head $H_{AB}$, and the same height position as the head $H_{AB}$. The heads $H_{AA}$ and $H_{AB}$ have a track width of 27 microns and have gaps with azimuth angles of $-30°$ and $+30°$, respectively. In FIG. 22, the head $H_{AB}$ is mounted at the position leading the center position between the mounting positions of the heads $H_{LA}$ and $H_{SA}$ by the angle $\theta_2$ of 175.4° along the rotating direction of the rotary body, however, this angle $\theta_2$ is assumed to be substantially equal to the angle by which the head $H_{AB}$ leads the head $H_{LA}$ in the rotating direction of the rotary body, and this angle $\theta_2$ is shown as 533.4° (=175.4°+360°) for convenience sake.

Description will now be given for the case where the recording is carried out in accordance with the Y/C separation recording system by use of the head arrangement shown in FIG. 22. In this case, the difference from the sixth embodiment is that the FM audio signal is supplied to the heads $H_{AA}$ and $H_{AB}$ in the present embodiment. The magnetic tape is transported at a high tape transport speed so that track are formed with a track pitch of 116 microns which is twice that of the standard mode. Thus, the head $H_{AA}$ which leads the heads $H_{LA}$ and $H_{SA}$ by 355.4° along the rotating direction of the rotary body as shown in FIG. 22 records the FM audio signal in a deep portion of the magnetic layer of the magnetic tape by forming an audio track 204 having a track width of 27 microns as shown in FIG. 23. On the way, the head $H_{SB}$ starts to record the FM luminance signal by forming a luminance signal recording track 205, and at the same time, the head $H_{LB}$ starts to record an information signal including at least the FM color difference signals by forming an information (color) signal recording track 206.

A guard band 207 having a width of 18.5 microns is formed between the tracks 205 and 206 which are independently but simultaneously formed on the magnetic tape. The track 205 having a track width of 46 microns is formed over the already formed audio track 204 having the track width of 27 microns. However, since the FM luminance signal is a high-frequency signal and is only recorded in a surface portion of the magnetic layer of the magnetic tape as described before, the FM audio signal recorded in the deep portion of the magnetic layer remains unerased.

Next, immediately after the formation of the tracks 205 and 206 is started, the head $H_{AB}$ starts to form an audio track 208 having a track width of 27 microns as shown in FIG. 23. On the way of forming a terminal portion of the audio track 208, the heads $H_{SA}$ and $H_{LA}$ start to form a luminance signal recording track 209 and an information (color) signal recording track 210. A guard band 211 having a width of 18.5 microns is formed between the tracks 209 and 210 which are formed simultaneously. The track 209 having a track width of 46 microns is formed over the already formed audio track 208, but the FM audio signal recorded in the deep portion of the magnetic layer remains unerased. A guard band 212 having a width of 24.5 (=116−(27+18.5+46)) microns is formed between the tracks 206 and 209.

Figure 24:
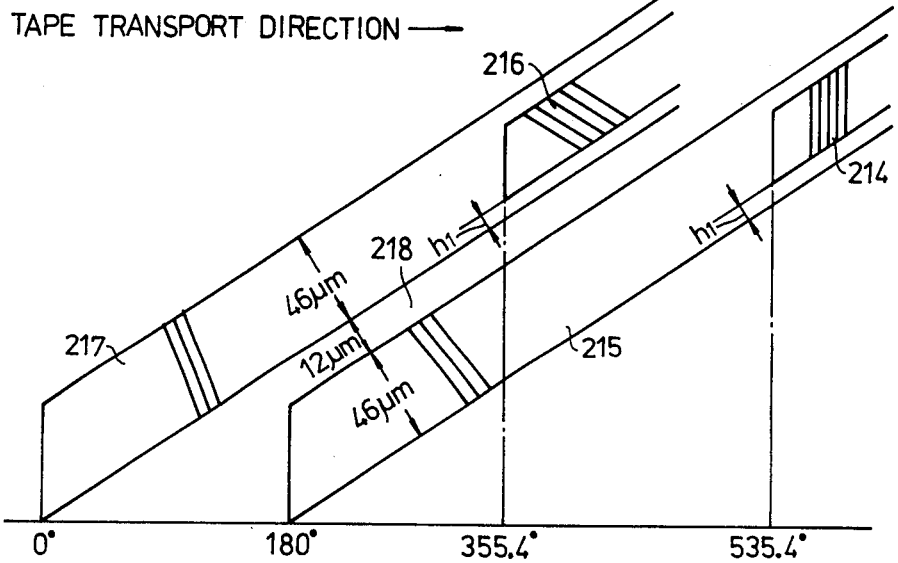
FIG. 24 shows on an enlarged scale a part of the track pattern formed in the standard mode of the seventh embodiment of the magnetic recording apparatus according to the present invention.

A track pattern shown in FIG. 24 is formed on the magnetic tape in the standard mode. Similarly as in the case of the track pattern shown in FIG. 20, a video track 215 is formed by the head $H_{SB}$ after an audio track 214 is formed by the head $H_{AB}$, and a video track 217 is formed by the head $H_{SA}$ after an audio track 216 is formed by the head $H_{AA}$. A guard band 218 having a width of 12 microns is formed between the video tracks 215 and 217. The track pattern shown in FIG. 24 is basically the same (in terms of track pitch, azimuth angle, track inclination angle and the like) as the track pattern obtained in the standard mode of the existing VTR, similarly as in the case of the track patterns shown in FIGS. 4B, 8B and 20.

Figure 25:
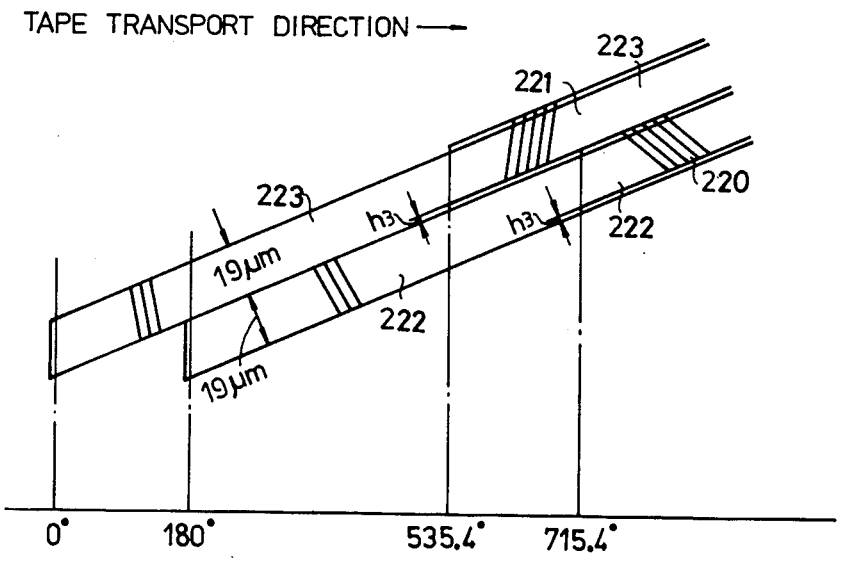
FIG. 25 shows on an enlarged scale a part of the track pattern formed in the extended mode of the seventh embodiment of the magnetic recording apparatus according to the present invention.

A track pattern shown in FIG. 25 is formed on the magnetic tape in the extended mode. Similarly as in the case of the track pattern shown in FIG. 21, the track pattern shown in FIG. 25 is basically the same as the track pattern which has the track pitch of 19 microns and is obtained in the extended mode of the existing VTR. In FIG. 25, an audio track 221 is formed by the head $H_{AB}$ after an audio track 220 is formed by the head $H_{AA}$. A video track 222 is formed over the audio track 220 by the head $H_{LB}$, and a video track 223 is formed over the audio track 221 by the head $H_{LA}$. Accordingly, the audio tracks 221 and 220 which are formed prior to the formation of the video tracks 223 and 222 by the heads $H_{LA}$ and $H_{LB}$ but in the same parts of the magnetic tape are formed by the heads $H_{AB}$ and $H_{AA}$ which respectively lead the heads $H_{LA}$ and $H_{LB}$ in the rotating direction of the rotary body by an angle $\theta_2$ as shown in FIG. 22.

FIGS. 23 through 25 show the track patterns for the case where the video signal to be recorded is the NTSC system video signal. In this case, when the angle by which the heads $H_{AA}$ and $H_{AB}$ respectively lead the heads $H_{SA}$ and $H_{SB}$ in the standard mode is designated by $\theta_1$ as shown in FIG. 22, this angle $\theta_1$ is not limited to 355.4° shown in FIG. 22 and may be within a predetermined angular range. When the angle by which the heads $H_{AB}$ and $H_{AA}$ respectively lead the heads $H_{LA}$ and $H_{LB}$ in the extended mode is designated by $\theta_2$ as shown in FIG. 22, this angle $\theta_2$ is also not limited to 535.4° shown in FIG. 22 and may be within a predetermined angular range. When the angle by which the heads $H_{AB}$ and $H_{AA}$ respectively lead the heads $H_{SA}$ and $H_{SB}$ in the recording carried out in accordance with the Y/C separation recording system is designated by $\theta_3$ as shown in FIG. 22, this angle $\theta_3$ is not limited to 175.4° and may be within a predetermined angular range.

Description will be given with respect to the ranges for the angles $\theta_1$, $\theta_2$ and $\theta_3$ by denoting a difference between the lower end of the video track and the lower end of the audio track in the standard mode by $h_1$ as shown in FIG. 22, denoting a difference between the lower end of the video track and the lower end of the audio track in the extended mode by $h_3$ as shown in FIG. 22, denoting a value obtained by adding to the difference $h_3$ the distance between the lower ends of the heads $H_{SA}$ and $H_{SB}$ and the lower ends of the heads $H_{LA}$ and $H_{LB}$ by $h_2$ as shown in FIG. 22, and denoting a height difference between the lower ends of the heads $H_{SA}$ and $H_{SB}$ and the lower ends of the heads $H_{AA}$ and $H_{AB}$ by $h_4$. Furthermore, a difference between the lower end of the luminance signal recording track 205 (or 209) and the lower end of the audio track 204 (or 208) during the recording carried out in accordance with the Y/C separation recording system is designated by $h_5$ as shown in FIGS. 22 and 23.

From FIG. 22, the following equations (13) and (14) stand for the angles $\theta_1$, $\theta_2$ and $\theta_3$.

$$\theta_2 = \theta_1 + 180 \quad (13)$$

$$\theta_3 = \theta_1 - 180 \quad (14)$$

During the standard mode, a track moving quantity $D_1$ is 58 microns with respect to a 180° rotation of the rotary body. Hence, the following equation (15) stands.

$$D_1 = h_4 - h_1 = 58 \times (\theta_1/180) \quad (15)$$

During the extended mode, a track moving quantity $D_2$ is 58/3 microns with respect to the 180° rotation of the rotary body, and the following equation (16) stands.

$$\begin{aligned} D_2 &= h_4 - h_2 \\ &= 58/3 \times (\theta_2/180) \\ &= 58/3 \times (\theta_1 + 180)/180 \end{aligned} \quad (16)$$

Furthermore, in the case of the recording carried out according to the Y/C separation recording system, a track moving quantity $D_3$ is 116 microns with respect to a 180° rotation of the rotary body when the tape transporting speed is set to twice the tape transport speed of the standard mode, and the following equation (17) stands.

$$\begin{aligned} D_3 &= h_4 - h_5 \\ &= 116 \times (\theta_3/180) \\ &= 116 \times (\theta_1 - 180)/180 \end{aligned} \quad (17)$$

The following equations (18) and (19) are obtained when the equations (15) and (16) are solved for $\theta_1$ and $h_4$.

$$\theta_1 = 270(h_2 - h_1)/58 + 90 \quad (18)$$

$$h_4 = (3h_2 - h_1)/2 + 58/2 \quad (19)$$

The following equations (20) and (21) are obtained when the equations (14) and (17) are solved for $\theta_3$ and $h_5$.

$$\theta_3 = 270(h_2 - h_1)/58 - 90 \quad (20)$$

$$\begin{aligned} h_5 &= h_4 - 116(\theta_1 - 180)/180 \\ &= -3h_2/2 + 5h_1/2 + (58 + 116)/2 \end{aligned} \quad (21)$$

The angle $\theta_1$ satisfies the following relation (22) when $h_1$, $h_2$ and $h_5$ are selected so that the center of the video track and the center of the audio track substantially coincide during the standard mode, the extended mode and the recording carried out in accordance with the Y/C separation recording system.

$$350° < \theta_1 < 367° \tag{22}$$

However, from the practical point of view, it is desirable that the angle $\theta_1$ is under 360° when the time difference between the video and audio signals are taken into consideration. Hence, it is desirable that the angle $\theta_1$ satisfies the following relation (23).

$$350° < \theta_1 < 360° \tag{23}$$

On the other hand, when recording the PAL system video signal, $\theta_1 = \theta_2$ and $\theta_3 = \theta_1 - 180$. In addition, during the standard mode, the track moving quantity $D_1$ is 49 microns with respect to a 180° rotation of the rotary body. Hence, the following equation (24) stands.

$$D_1 = h_4 - h_1 = 49 \times (\theta_1/180) \tag{24}$$

During the extended mode, the track moving quantity $D_2$ is 49/2 microns with respect to the 180° rotation of the rotary body, and the following equation (25) stands.

$$D_2 = h_4 - h_2 \tag{25}$$
$$= 49/2 \times (\theta_2/180)$$
$$= 49/2 \times (\theta_1/180)$$

Furthermore, in the case of the recording carried out according to the Y/C separation recording system, the track moving quantity $D_3$ is 98 microns with respect to a 180° rotation of the rotary body when the tape transporting speed is set to twice the tape transport speed of the standard mode, and the following equation (26) stands.

$$D_3 = h_4 - h_5 \tag{26}$$
$$= 116 \times (\theta_3/180)$$
$$= 116 \times (\theta_1 - 180)/180$$

The following equations (27) and (28) are obtained when the equations (24) and (25) are solved for $\theta_1$ and $h_4$.

$$\theta_1 = 360(h_2 - h_1)/49 \tag{27}$$

$$h_4 = 2H_2 - h_1 \tag{28}$$

The following equations (29) and (30) are obtained when the equation (26) is solved for $\theta_3$ and $h_5$ since $\theta_3 = \theta_1 - 180°$.

$$\theta_3 = \theta_1 - 180 \tag{29}$$
$$= 360(h_2 - h_1)/49 - 180$$

$$h_5 = h_4 - 98(\theta_1 - 180)/180 \tag{30}$$
$$= -2h_2 + 3h_1 + 98$$

The angle $\theta_1$ satisfies the following relation (31) when $h_1$, $h_2$ and $h_5$ are selected so that the center of the video track and the center of the audio track substantially coincide during the standard mode, the extended mode and the recording carried out in accordance with the Y/C separation recording system.

$$349° < \theta_1 < 393° \tag{31}$$

However, from the practical point of view, it is desirable that the angle $\theta_1$ is under 360° when the time difference between the video and audio signals are taken into consideration. Hence, it is desirable that the angle $\theta_1$ satisfies the following relation (32).

$$349° < \theta_1 < 360° \tag{32}$$

In the description given in conjunction with FIG. 23 for the recording carried out in accordance with the Y/C separation recording system, it is described that the audio tracks are formed in the same parts on the magnetic tape as the corresponding luminance signal recording tracks 205 and 209. However, it is possible to form the audio tracks in the same parts on the magnetic tape as the corresponding color signal recording tracks 206 and 210. In this case, the widths of the guard bands 207 and 211 are set to 4 microns, and the tape transport speed is set to twice the tape transport speed of the standard mode. In addition, the leading angle $\theta_1$ is selected within a range of $251° < \theta_1 < 265°$ for the case where the NTSC system video signal is to be recorded and is selected within a range of $254° < \theta_1 < 261°$ for the case where the PAL system video signal is to be recorded, as may be seen by analogy from the description given before.

When the height difference between the upper ends of the heads $H_{SA}$ and $H_{SB}$ and the lower ends of the heads $H_{LA}$ and $H_{LB}$ is changed, the leading angle $\theta_1$ and the height difference between the upper ends of the heads $H_{LA}$ and $H_{LB}$ and the lower ends of the heads $H_{AA}$ and $H_{AB}$ change accordingly.

Further, the present invention is not limited to these embodiments, but various variations and modifications may be made without departing from the scope of the present invention.

What is claimed is:

1. A magnetic recording apparatus for carrying out a recording by selectively using one of two kinds of recording systems, said magnetic recording apparatus comprising:

first and second rotary magnetic heads mounted on a rotary body at mutually opposing positions on a rotational plane of said rotary body, said rotary body being wrapped obliquely with a magnetic tape on an outer peripheral surface thereof for a predetermined angular range, said first and second rotary magnetic heads having identical height positions along an axial direction of said rotary body and respectively having gaps with first and second azimuth angles, said first and second azimuth angles being identical to standardized azimuth angles of gaps of rotary magnetic heads used in an existing magnetic recording and/or reproducing apparatus employing a low band conversion color recording and reproducing system, said low band conversion color recording and reproducing system recording and reproducing a frequency division multiplexed signal comprising a frequency modulated luminance signal and a frequency converted carrier chrominance signal which has been frequency-converted into a frequency band lower than a frequency band of the frequency modulated luminance signal;

third and fourth rotary magnetic heads mounted on said rotary body at mutually opposing positions respectively close to said first and second rotary magnetic heads on the rotational plane of said rotary body along a rotating direction of said rotary body, said third and fourth rotary magnetic heads having height positions different from the height positions of said first and second rotary magnetic heads and respectively having gaps with said first and second azimuth angles;

first signal producing means for producing a frequency modulated luminance signal by frequency-modulating a carrier by a luminance signal;

second signal producing means for producing a first frequency division multiplexed signal at least including one or two frequency modulated color difference signals;

third signal producing means for producing a second frequency division multiplexed signal comprising a frequency modulated luminance signal and a frequency converted carrier chrominance signal, said second frequency division multiplexed signal having a frequency spectrum identical to a frequency spectrum of the frequency division multiplexed signal recorded and reproduced in said existing magnetic recording and/or reproducing apparatus employing the low band conversion color recording and reproducing system; and switching means for selectively supplying said frequency modulated luminance signal from said first signal producing means to said first and second rotary magnetic heads and supplying said first frequency division multiplexed signal from said second signal producing means to said third and fourth rotary magnetic heads when a luminance/color separation recording system is selected as the recording system, and for selectively supplying said second frequency division multiplexed signal from said third signal producing means to one pair of rotary magnetic heads out of a first pair constituted by said first and second rotary magnetic heads and a second pair constituted by said third and fourth rotary magnetic heads, said luminance/color separation recording system independently but simultaneously recording a luminance signal and a color signal on two parallel tracks of the magnetic tape, when said luminance/color separation recording system is selected as the recording system a track recorded with said frequency modulated luminance signal from said first signal producing means being formed by one of said first and second rotary magnetic heads and a track recorded with said first frequency division multiplexed signal being formed by one of said third and fourth rotary magnetic heads simultaneously at different parts on the magnetic tape, when said low band conversion color recording system is selected as the recording system tracks recorded with said second frequency division multiplexed signal being successively formed on the magnetic tape by one of said first and second pairs of rotary magnetic heads constituted by two rotary magnetic heads which alternately scan the magnetic tape.

2. A magnetic recording apparatus as claimed in claim 1 in which said first and second rotary magnetic heads are standard mode rotary magnetic heads identical to rotary magnetic heads used in a standard mode of said existing magnetic recording and/or reproducing apparatus employing the low band conversion color recording and reproducing system, and said third and fourth rotary magnetic heads are extended mode rotary magnetic heads identical to rotary magnetic heads used in an extended mode of said existing magnetic recording and/or reproducing apparatus employing the low band conversion color recording and reproducing system, said extended mode rotary magnetic heads having track widths narrower than track widths of said standard mode rotary magnetic heads.

3. A magnetic recording apparatus as claimed in claim 1 in which said first through fourth rotary magnetic heads have identical track widths smaller than ½ a track pitch of tracks formed in a standard mode of said existing magnetic recording and/or reproducing apparatus employing the low band conversion color recording and reproducing system.

4. A magnetic recording apparatus as claimed in claim 2 which further comprises a tape transport mechanism for transporting the magnetic tape at a tape transport speed of said standard mode when said luminance/color separation recording system is selected as the recording system and for transporting the magnetic tape at one of the tape transport speed of said standard mode and a tape transport speed of said extended mode when said low band conversion color recording system is selected as the recording system.

5. A magnetic recording apparatus as claimed in claim 1 in which said second signal producing means comprises means for independently frequency-modulating two carriers by two kinds of color difference signals so as to obtain first and second frequency modulated color difference signals occupying mutually different frequency bands, and means for frequency-division-multiplexing said first and second frequency modulated color difference signals so as to produce said first frequency division multiplexed signal comprising said first and second frequency modulated color difference signals.

6. A magnetic recording apparatus as claimed in claim 1 in which said second signal producing means comprises means for frequency-modulating a first carrier by a line-sequential color difference signal so as to obtain a frequency modulated line-sequential color difference signal, means for frequency-modulating a second carrier by a pulse code modulated audio signal so as to obtain a first frequency modulated signal, and means for frequency-division-multiplexing said frequency modulated line-sequential color difference signal and said first frequency modulated signal so as to produce said first frequency division multiplexed signal comprising said frequency modulated line-sequential color difference signal and said first frequency modulated signal.

7. A magnetic recording apparatus as claimed in claim 6 in which said first frequency modulated signal occupies a frequency band higher than a frequency band of said frequency modulated line-sequential color difference signal, and there is further provided means for carrying out an after-recording when said luminance/color separation recording system is selected as the recording system by recording only said first frequency modulated signal on a surface portion of a magnetic layer of the magnetic tape by said third and fourth rotary magnetic heads over tracks already recorded by said third and fourth rotary magnetic heads.

8. A magnetic recording apparatus as claimed in claim 6 in which said pulse code modulated audio signal comprises a first composite synchronizing signal time-division-multiplexed thereto, and there is further provided means for synchronizing a phase of said first composite synchronizing signal and a phase of a second composite synchronizing signal within said frequency modulated luminance signal which is recorded by said first and second rotary magnetic heads with a relative time difference corresponding to a relative difference in mounting positions of said first and second rotary magnetic heads and said third and fourth rotary magnetic heads on said rotary body so that recorded positions of vertical synchronizing signals recorded by said first and second rotary magnetic heads and recorded positions of vertical synchronizing signals recorded by said third and fourth rotary magnetic heads occur at predetermined positions after respective head switching points where switching of the rotary magnetic heads to be used take place.

9. A magnetic recording apparatus as claimed in claim 2 which further comprises fifth and sixth rotary magnetic heads for recording a frequency modulated audio signal in a deep portion of a magnetic layer of the magnetic tape by forming audio tracks prior to formation of tracks which are formed at substantially the same positions on the magnetic tape as said audio tracks and are recorded with said second frequency division multiplexed signal by one of said standard mode rotary magnetic heads and said extended mode rotary magnetic heads only when said low band conversion color recording system is selected as the recording system, said fifth and sixth rotary magnetic heads being exclusively for recording the audio signal and having gaps with mutually different azimuth angles, said fifth and sixth rotary magnetic heads having height positions higher than height positions of said standard mode rotary magnetic heads and said extended mode rotary magnetic heads, said fifth and sixth rotary magnetic heads being mounted on the rotational plane of said rotary body at positions respectively leading said standard mode rotary magnetic heads by an angle $\theta_1$ along the rotating direction of said rotary body.

10. A magnetic recording apparatus as claimed in claim 9 in which said magnetic recording apparatus is an apparatus for recording an NTSC system video signal and wherein rotary magnetic heads which scan over already formed audio tracks differ between said standard and extended modes, said angle $\theta_1$ being set within a range of $332° < \theta_1 < 360°$, said standard mode rotary magnetic heads having a track width of 46 microns, said extended mode rotary magnetic heads having a track width of 27 microns, a height difference of 21.5 microns existing between lower ends of said extended mode rotary magnetic heads and upper ends of said standard mode rotary magnetic heads.

11. A magnetic recording apparatus as claimed in claim 9 in which said magnetic recording apparatus is an apparatus for recording PAL system video signal and wherein rotary magnetic heads which scan over already formed audio tracks are the same in said standard and extended modes, said angle $\theta_1$ being set within a range of $314° < \theta_1 < 360°$, said standard mode rotary magnetic heads having a track width of 46 microns, said extended mode rotary magnetic heads having a track width of 27 microns, a height difference of 21.5 microns existing between lower ends of said extended mode rotary magnetic heads and upper ends of said standard mode rotary magnetic heads.

12. A magnetic recording apparatus as claimed in claim 2 which further comprises fifth and sixth rotary magnetic heads for recording a frequency modulated audio signal in a deep portion of a magnetic layer of the magnetic tape by forming audio tracks prior to formation of tracks which are formed at substantially the same positions on the magnetic tape as said audio tracks and are recorded with one of said frequency modulated luminance signal and said first frequency division multiplexed signal by one of said standard mode rotary magnetic heads and said extended mode rotary magnetic heads when said luminance/color separation recording system is selected as the recording system, and for recording the frequency modulated audio signal in the deep portion of the magnetic layer of the magnetic tape by forming the audio tracks prior to formation of tracks which are formed at substantially the same positions on the magnetic tape as said audio tracks and are recorded with said second frequency division multiplexed signal by one of said standard mode rotary magnetic heads and said extended mode rotary magnetic heads when said low band conversion color recording system is selected as the recording system, said fifth and sixth rotary magnetic heads being exclusively for recording the audio signal and having gaps with mutually different azimuth angles, said fifth and sixth rotary magnetic heads having height positions higher than height positions of said standard mode rotary magnetic heads and said extended mode rotary magnetic heads, said fifth and sixth rotary magnetic heads being mounted on the rotational plane of said rotary body at positions respectively leading said standard mode rotary magnetic heads by an angle $\theta_1$ along the rotating direction of said rotary body.

* * * * *